(12) United States Patent
Hayashida

(10) Patent No.: US 8,972,073 B2
(45) Date of Patent: Mar. 3, 2015

(54) OPERATION PLANNING METHOD, OPERATION PLANNING DEVICE, HEAT PUMP HOT WATER SUPPLY SYSTEM OPERATION METHOD, AND HEAT PUMP HOT WATER SUPPLY AND HEATING SYSTEM OPERATION METHOD

(75) Inventor: Gaku Hayashida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/511,289

(22) PCT Filed: Oct. 18, 2011

(86) PCT No.: PCT/JP2011/005824
§ 371 (c)(1),
(2), (4) Date: May 22, 2012

(87) PCT Pub. No.: WO2012/063409
PCT Pub. Date: May 18, 2012

(65) Prior Publication Data
US 2012/0232706 A1   Sep. 13, 2012

(30) Foreign Application Priority Data

Nov. 10, 2010   (JP) .................................. 2010-252341

(51) Int. Cl.
*G06F 19/00* (2011.01)
*F24D 19/10* (2006.01)
(Continued)

(52) U.S. Cl.
CPC ........ *F24D 19/1039* (2013.01); *F24D 2200/02* (2013.01); *F24D 2200/08* (2013.01);
(Continued)

(58) Field of Classification Search
USPC ................. 60/641.1; 700/282, 287, 288, 295; 362/293; 315/312, 322; 370/230
See application file for complete search history.

(56) References Cited

U.S. PATENT DOCUMENTS 7,449,798 B2   11/2008   Suzuki et al.
8,445,155 B2 *  5/2013   Park ............................. 429/435
(Continued)

FOREIGN PATENT DOCUMENTS

CN   1494190   5/2004
EP   1993183   11/2008
(Continued)

OTHER PUBLICATIONS

China Office action, dated Apr. 1, 2014 along with an english translation thereof.
(Continued)

*Primary Examiner* — Charles Kasenge
(74) *Attorney, Agent, or Firm* — Greenblum & Bernstein, P.L.C.

(57) ABSTRACT

An operation planning method performed in a system including a power generation device, a first electric load operating using power generated by the power generation device, and a second electric load which generates heat using power generated by the power generation device. The operation planning method is performed to design an operation plan for the second electric load and includes: predicting, for individual unit time periods, an amount of power to be generated by the power generation device and an amount of power to be consumed by the first electric load; and designing the operation plan for the second electric load to operate during an operation period including the time period with the largest amount of reverse power, calculated by subtracting the amount of power to be consumed from the amount of power to be generated.

16 Claims, 16 Drawing Sheets

(51) Int. Cl.
*G06Q 10/06* (2012.01)
*G06Q 50/06* (2012.01)
*G05D 23/19* (2006.01)
*H02J 3/14* (2006.01)
*H02J 3/00* (2006.01)

(52) U.S. Cl.
CPC ......... *F24D2200/12* (2013.01); *F24H 2240/09* (2013.01); *G06Q 10/06* (2013.01); *G06Q 50/06* (2013.01); *G05D 23/1924* (2013.01); *H02J 3/14* (2013.01); *H02J 2003/003* (2013.01); *H02J 2003/143* (2013.01); *Y02B 70/3225* (2013.01); *Y02B 70/3275* (2013.01); *Y02B 30/762* (2013.01); *Y04S 20/222* (2013.01); *Y04S 20/244* (2013.01)
USPC ............ 700/295; 700/286; 700/296; 700/297

(56) References Cited

U.S. PATENT DOCUMENTS

| | | |
|---|---|---|
| 2003/0050738 A1 | 3/2003 | Masticola et al. |
| 2004/0066094 A1 | 4/2004 | Suzuki et al. |
| 2009/0085404 A1 | 4/2009 | Suzuki et al. |
| 2010/0004790 A1 | 1/2010 | Harbin, III et al. |
| 2010/0274402 A1 | 10/2010 | Shaffer |
| 2012/0186278 A1 | 7/2012 | Hayashida |
| 2012/0232706 A1* | 9/2012 | Hayashida .................. 700/282 |

FOREIGN PATENT DOCUMENTS

| | | |
|---|---|---|
| GB | 2446418 | 8/2008 |
| GB | 2462913 | 3/2010 |
| JP | 2003-254161 | 9/2003 |
| JP | 2004-194485 | 7/2004 |
| JP | 2006-158027 | 6/2006 |
| JP | 2006-295090 | 10/2006 |
| JP | 2008-2702 | 1/2008 |
| JP | 2009-268247 | 11/2009 |
| JP | 2009-284586 | 12/2009 |
| JP | 2010-249333 | 11/2010 |
| NL | 1035008 | 5/2009 |
| WO | 03/023675 | 3/2003 |
| WO | 2009/023231 | 2/2009 |

OTHER PUBLICATIONS

Search report from E.P.O., mail date is Nov. 11, 2014.

* cited by examiner

FIG. 5

| Time | Predicted amount of reverse power [kWh] | Priority |
|---|---|---|
| 00:00 | 0 | 8 |
| 01:00 | 0 | 8 |
| 09:00 | 0 | 8 |
| 10:00 | 1.00 | 4 |
| 11:00 | 1.44 | 2 |
| 12:00 | 1.68 | 1 |
| 13:00 | 1.38 | 3 |
| 14:00 | 0.92 | 5 |
| 15:00 | 0.43 | 6 |
| 16:00 | 0.20 | 7 |
| 17:00 | 0 | 8 |
| 18:00 | 0 | 8 |
| 23:00 | 0 | 8 |

Remote control setting categories and information

FIG. 14

| Day of the week | SUN - SAT | SUN - SAT | SUN - SAT | SUN MON TUE WED THU FRI SAT |
|---|---|---|---|---|
| Load power history | | | | |
| Hot water supply heat history | | | | |
| PV-generated power history | | | | |
| Solar radiation history | | | | |

Four weeks / One week

| Time | 0 | 1 | 2 | 3 | - - - | 20 | 21 | 22 | 23 | 0 | 1 | - - - | 23 |
|---|---|---|---|---|---|---|---|---|---|---|---|---|---|
| Load power history | | | | | | | | | | | | | |
| Hot water supply heat history | | | | | | | | | | | | | |
| PV-generated power history | | | | | | | | | | | | | |
| Solar radiation history | | | | | | | | | | | | | |

OPERATION PLANNING METHOD, OPERATION PLANNING DEVICE, HEAT PUMP HOT WATER SUPPLY SYSTEM OPERATION METHOD, AND HEAT PUMP HOT WATER SUPPLY AND HEATING SYSTEM OPERATION METHOD

TECHNICAL FIELD

The present invention relates to a device relating to power generation such as a photovoltaic device (solar power generation device), and to a system which includes a device that consumes power such as a heat pump.

BACKGROUND ART

Power generation devices, such as a solar or wind power generation devices, are devices designed to create energy. Solar power is generated by transforming solar energy into electricity and is supplied to homes as a natural source of energy. The amount of power generation continuously fluctuates with weather and meteorological conditions.

A heat pump hot water heater heats a refrigerant by absorbing heat from the atmosphere and compressing the refrigerant using electricity, and then transfers the heat to the water via a heat exchanger, thereby creating hot water. With this method, the hot water supply system uses less energy than with an electric hot water heater in which heating is done by an electric heater.

The heat pump hot water supply system which includes the power generation device constitutes a combination of the above devices, and supplies a consumer with power and heat. An example of a conventional heat pump hot water supply and heating system which includes a power generation device is disclosed in PTL 1.

PTL 1 discloses an invention which obtains weather forecast information from a server using a weather information obtaining unit, and switches to use solar generated power to boil the water in the $CO_2$ heat pump hot water heater instead of late night power from a commercial power source when the obtained information is set up as a condition for operation. Operating using power harnessed from natural energy allows for a power efficient, low-energy electric hot water heater which can reduce electricity costs.

CITATION LIST

[PTL 1] Japanese Unexamined Patent Application Publication No. 2008-2702
[PTL 2] Japanese Unexamined Patent Application Publication No. 2006-158027

Technical Problem

However, the conventional device does not take into consideration the amount of consumption of the reverse power derived from the constantly fluctuating photovoltaic device and consumer's electric load. As the number of homes simultaneously generating reverse power increases with the growing prevalence of solar power generation, the voltage of a power grid will increase, causing the grid to become unstable. Moreover, the consumer, who is located on the downstream side of the grid, cannot flow reverse power when the voltage of the grid is high, causing the power generated by the photovoltaic device to go to waste.

Moreover, the voltage of the reverse power is converted according to the electricity distribution system which causes a significant conversion loss in the process. Transmitting the power to another consumer also causes a transmission loss in the process as well. As such, it is more environmental for the consumer to consume the generated power on location.

Furthermore, with the device proposed in PTL 2, the heat pump unit is operated when the amount of generated power exceeds the amount of power used. However, the heat pump unit is not operated in response to the amount of excess power, nor does it effectively reduce the amount of power flowing in reverse to the grid.

The present invention is conceived to solve the above-described problems and is designed to provide an operation planning method for a system including a power generation device in which the system maintains a low-energy performance characteristic and reduces the amount of reverse power.

Solution to Problem

An operation planning method according to an embodiment of the present invention is performed in a system including a power generation device, a first electric load which operates using power generated by the power generation device, and a second electric load which generates heat using power generated by the power generation device, the second electric load including a heat generation unit which generates heat using power generated by the power generation device, the operation planning method being performed to design an operation plan for the second electric load. Specifically, the planning method comprises: predicting, for individual unit time periods, an amount of power to be generated by the power generation device and an amount of power to be consumed by the first electric load; and designing the operation plan for the second electric load to cause the second electric load to operate during an operation period which includes, among the time periods, a time period in which an amount of reverse power is the largest, the reverse power being calculated by subtracting the amount of power to be consumed from the amount of power to be generated.

With this configuration, damage to a power grid can be reduced by predicting a time period in which the amount of reverse power will peak, and operating the second electric load in the predicted time period.

The power generation device may be a photovoltaic device, for example. Moreover, the second electric load may include a heat generation unit which generates heat using power generated by the power generation device, a heat storage unit which stores heat generated by the heat generation unit, and a radiator unit which radiates heat stored in the heat storage unit. In the predicting, an amount of heat to be radiated in reverse flow standby by the radiator unit during a reverse flow standby time period is further predicted, the reverse flow standby time period being a time period in which the amount of power to be consumed exceeds the amount of power to be generated, and in the designing, an operation plan for the heat generation unit to operate during the operation period is designed such that an amount of heat is stored in the heat storage unit, the amount of heat corresponding to the amount of heat to be radiated in reverse flow standby as predicted by the predicting unit.

Moreover, in the designing, the operation plan may be designed for the operation period which is determined by selecting one or more of the time periods in descending order of the amount of reverse power until a total amount of time of one or more selected time periods exceeds an amount of time required for the heat generation unit to generate the amount of heat corresponding to the amount of heat to be radiated in reverse flow standby.

Moreover, in the designing, a reverse power threshold value may be set to be the amount of reverse power with the lowest value among the one or more selected time periods, and the operation plan may be designed such that operation of the heat generation unit is started at a point in time at which the reverse power as actually measured becomes equal to or exceeds the reverse power threshold value during the operation period.

In the designing, the operation plan may further be designed such that operation of the heat generation unit is stopped at a point in time at which the amount of heat corresponding to the amount of heat to be radiated in reverse flow standby is generated during the operation period.

Moreover, the heat storage unit may include a thermal storage medium whose temperature varies according to the amount of heat stored. Furthermore, the heat generation unit may include a heat pump capable of heating the thermal storage medium to a first temperature, and a heater capable of heating the thermal storage medium beyond the first temperature. Additionally, in the designing, with respect to the amount of heat corresponding to the amount of heat to be radiated in reverse flow standby, the operation plan may be designed to cause the heat pump to generate an amount of heat until the thermal storage medium reaches the first temperature, and cause the heater to generate an amount of heat after the thermal storage medium reaches the first temperature.

Moreover, in the predicting, the amount of heat to be radiated by the radiator unit during the reverse flow standby time period may be predicted as the amount of heat to be radiated in reverse flow standby, the reverse flow standby time period being a time period delimited by a reverse flow standby start time and a predetermined assumed time at which the radiator unit will stop radiating heat, and the reverse flow standby start time being a time when the amount of reverse power changes from a positive value to a non-positive value.

Moreover, in the predicting, the amount of power to be consumed may be predicted for each time period to be equivalent to an average of power consumption values previously measured in a corresponding time period on the same day of the week, and the amount of heat to be radiated in reverse flow standby may be predicted for each time period to be equivalent to an average of reverse flow standby radiated heat values previously measured in a corresponding time period on the same day of the week.

Moreover, in the predicting, a predicted amount of solar radiation may be obtained for each time period for a prediction target day, and the amount of power to be generated during each time period may be predicted to be equivalent to, from among previously measured amounts of generated power, an amount of generated power from the time period having an amount of solar radiation that is closest to the predicted amount of solar radiation.

An operation planning device according to an embodiment of the present invention is the operation planning device in a system including a power generation device, a first electric load which operates using power generated by the power generation device, and a second electric load which generates heat using power generated by the power generation device, the operation planning device configured to design an operation plan for the second electric load. Specifically, the operation planning device comprises: a prediction unit which predicts, for individual unit time periods, an amount of power to be generated by the power generation device and an amount of power to be consumed by the first electric load; and an operation planning unit which designs an operation plan for the second electric load to cause the second electric load to operate during an operation period which includes, among the time periods, a time period in which an amount of reverse power is the largest, the reverse power being calculated by subtracting the amount of power to be consumed from the amount of power to be generated.

An operation method for a heat pump hot water supply system according to an embodiment of the present invention is an operation method for a heat pump hot water supply system comprising a photovoltaic device, a heat pump hot water supply device, and an operation planning device. The operation planning device controls the system, including: predicting an amount of power to be generated by the power generation device and an amount of power to be consumed by an electric load; calculating an amount of reverse power by subtracting the amount of power to be consumed from the amount of power to be generated; predicting an amount of heat (the amount of heat to be radiated in reverse flow standby) required in a reverse flow standby time period during which the amount of reverse power is zero; and designing an operation plan which causes the heat pump hot water supply device to operate to store the predicted amount of heat during an operation period which includes a time period in which the amount of reverse power is the largest.

Moreover, in the designing, a heat storage target temperature to store the predicted amount of heat may be determined and a reverse power threshold value may be set to the amount of reverse power with the lowest value among the one or more selected time periods.

Moreover, based on the heat storage target temperature and the reverse power threshold value determined and set in the designing, operation of the heat pump hot water supply device may be started at a point in time at which the reverse power as measured reaches or exceeds the reverse power threshold value during the operation period, and operation of the heat pump hot water supply device may be stopped at a point in time at which the predicted amount of heat is generated during the operation period.

Moreover, the amount of power to be generated, the amount of power to be consumed, and the amount of heat may be predicted using history information stored in a storage unit.

Moreover, the operation planning device may be installed inside the heat pump hot water supply device.

An operation method for a heat pump hot water supply and heating device according to an embodiment of the present invention is an operation method for a heat pump hot water supply and heating system comprising a photovoltaic device and a heat pump hot water supply and heating device. The heat pump hot water supply and heating device includes a hot water supply tank and a heating device. The system includes an operation planning device. The operation planning device controls the system, including: predicting an amount of power to be generated by the power generation device and an amount of power to be consumed by an electric load; calculating an amount of reverse power by subtracting the amount of power to be consumed from the amount of power to be generated; predicting an amount of heat (the amount of heat to be radiated in reverse flow standby) required in a reverse flow standby time period during which the amount of reverse power is zero; and designing an operation plan which causes the heat pump hot water supply and heating device to operate to store the predicted amount of heat during an operation period which includes a time period in which the amount of reverse power is the largest.

Moreover, in the designing, a heat storage target temperature to store the predicted amount of heat may be determined and a reverse power threshold value may be set to the amount of reverse power with the lowest value among the one or more selected time periods.

Moreover, based on the heat storage target temperature and the reverse power threshold value determined and set in the designing, operation of the heat pump hot water supply device may be started at a point in time at which the reverse power as measured reaches or exceeds the reverse power threshold value during the operation period, and operation of the heat pump hot water supply device may be stopped at a point in time at which the predicted amount of heat is generated during the operation period.

Moreover, in the designing, the heat storage target temperature for storing the predicted amount of heat in a hot water supply tank may be determined, and a thermal storage medium inside the hot water supply tank may be heated to a first temperature with a heat pump included in the heat pump hot water supply and heating device, then the thermal storage medium may be heated to a second temperature which is higher than the first temperature with a heater installed in the hot water supply tank.

Moreover, the heat pump hot water supply and heating device includes a hot water supply and heating control device. The hot water supply and heating control device may be set up to receive operation information for the heat pump hot water supply and heating device from a remote control as well as from the operation planning device. When received from the operation planning device, the hot water supply and heating control device may give the operation information from the operation planning device priority over the operation information from the remote control, and may control the heat pump hot water supply and heating device based on the operation information from the operation planning device.

Moreover, the operation information may be an operation mode for the heat pump hot water supply and heating device, and a hot water supply temperature setting for the hot water supply tank.

Moreover, the heat pump hot water supply and heating device includes a heat exchanger, and a thermal storage medium supplied from the heat exchanger is controlled via a switching device so as to be supplied to one of a hot water supply tank and a heating device.

Advantageous Effects of Invention

The present invention can reduce damage to a power grid by predicting a time period in which the amount of reverse power will peak, and operating the system in the predicted time period.

BRIEF DESCRIPTION OF DRAWINGS

FIG. 5 is a table showing the priority for each time period assigned in descending order by predicted amount of reverse power.
FIG. 14 is a table showing a format of the information stored in the storage unit.

DESCRIPTION OF EMBODIMENTS

Figure 1:
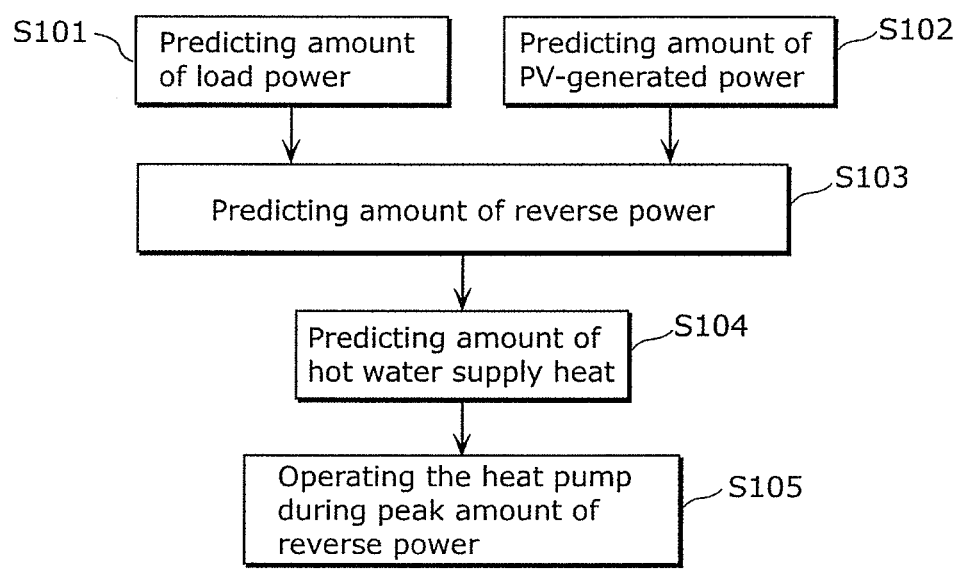
FIG. 1 is a flowchart showing a principle of the present invention.

Hereinafter, embodiments of present invention are described with reference to the drawings. As shown in FIG. 1, with the present invention, the amount of reverse power is predicted (S103) from the prediction of an amount of load power (S101) which is an amount of power consumed within a home and the prediction of an amount of PV-generated power (S102) which is an amount of power generated by photovoltaics. The heat pump (hereinafter also referred to as HP) is then made to operate during a time period with the peak predicted amount of reverse power (S105). The heat pump duration of operation is determined from the predicted amount of hot water supply heat (S104). As a result, the amount of power flowing in reverse to the power grid can be reduced, and the effect power flowing in reverse has on the power grid can be effectively reduced.

First Embodiment

Heat Pump Hot Water Supply Device

Figure 2:
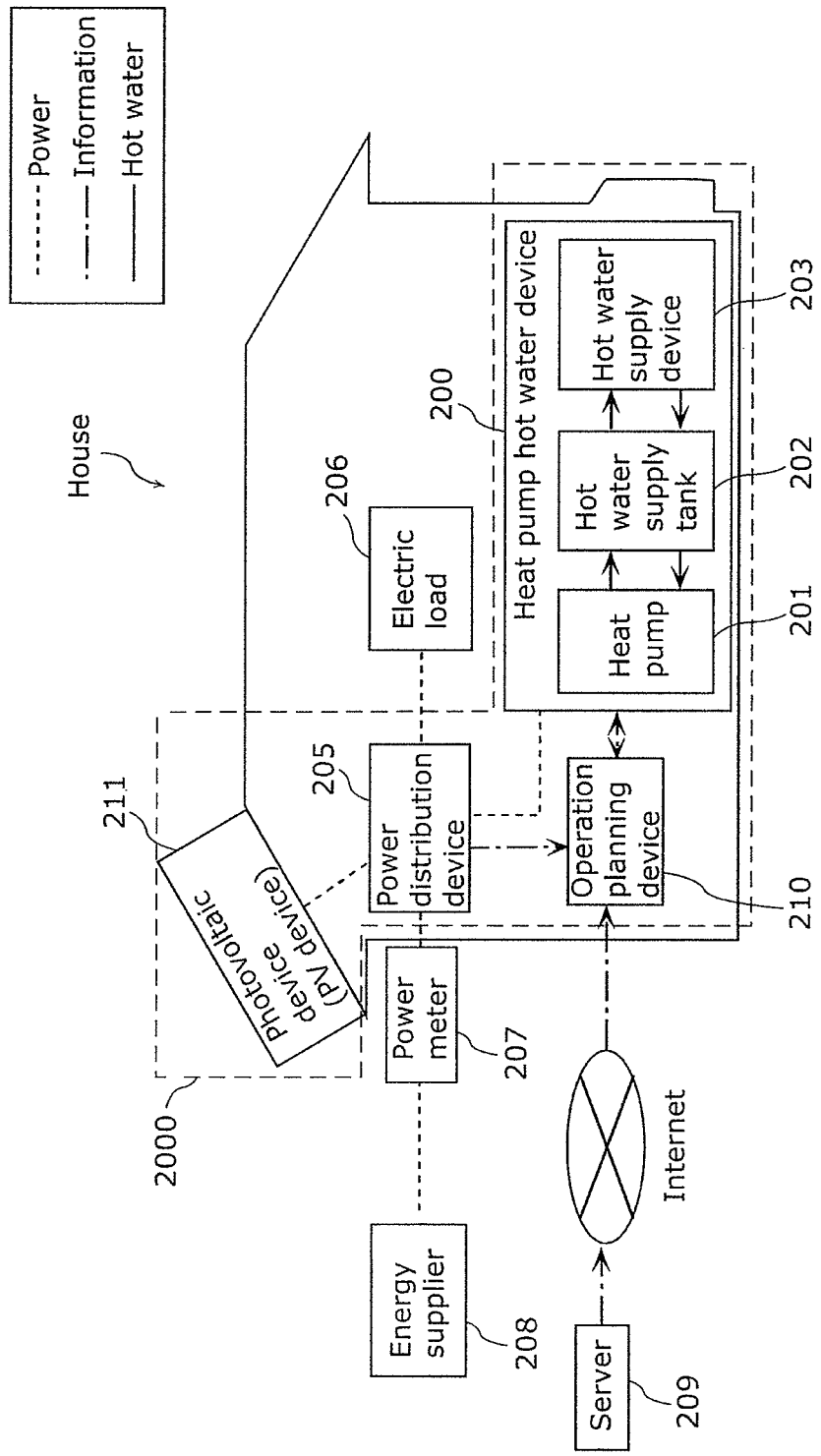
FIG. 2 is a block diagram of the heat pump hot water supply system including the power generation device according to the first embodiment.

FIG. 2 is a block diagram showing the heat pump hot water supply system according to the first embodiment of the present invention. An energy supplier 208 (source of electric power) as shown in FIG. 2 supplies power via a power grid to homes. The power grid is a network that provides a stable supply of power. A power meter 207 measures the amount of power supplied via the power grid that is consumed in a home. Moreover, the power meter 207 is set up to consume power generated by a photovoltaic device 211 in-home, and sell excess power to the grid.

The house shown in FIG. 2 is equipped with a electric load 206 (the first electric load), a heat pump hot water supply device 200 (the second electric load), an operation planning device 210, the photovoltaic device 211, and a power distribution device 205. The heat pump hot water supply device 200 includes at least a heat pump 201, a hot water supply tank 202, and a hot water supply device 203. The electric load 206 is an appliance which operates on a received supply of power such as an air conditioner, washing machine, or refrigerator.

The photovoltaic device 211 is a device which converts energy from the sun into electric power. The photovoltaic device 211 converts energy from the sun into electric power and outputs the power (PV-generated power).

The power distribution device 205 obtains power from the photovoltaic device 211 and a commercial power source supplied by the energy supplier 208 then distributes the power to the heat pump hot water supply device 200 and the electric load 206 on demand. The power distribution device 205 can also measure the amount of power distributed.

The power distribution device 205 obtains PV-generated power from the photovoltaic device 211 and measures a load power, which is power consumed by the electric load 206, and a hot water supply power, which is power consumed by the heat pump hot water supply device 200. When the sum of the load power and the hot water supply power exceeds the PV-generated power, power purchased from the power grid is obtained via the power meter 207. That is, the power distribution device 205 obtains purchased power and PV-generated power, then supplies hot water supply power to the heat pump hot water supply device 200 and load power to the electric load 206. Moreover, when the PV-generated power exceeds the sum of the hot water supply power and the load power, surplus power can be transmitted as reverse power and sold to the energy supplier 208.

The power distribution device 205 also includes a converter and inverter which, when obtained power is transmitted as described above, converts the voltage and performs AC-DC and DC-AC conversion of the obtained power accordingly so the obtained power conforms to the transmitted power. Moreover, the power distribution device 205 transmits the load power actually consumed by the electric load 206 and the PV-generated power actually generated by the photovoltaic device 211 to the operation planning device 210.

A server 209 is a device which transmits the current amount of solar radiation for the consumer's residence and a predicted future amount of solar radiation via the Internet. According to the first embodiment, the server 209 transmits via the Internet an amount of solar radiation measured in the area of the consumer's residence at a predetermined time interval.

Moreover, the server 209 calculates a predicted value of an amount of solar radiation for each hour for 24 hours from the start of the day at 00:00 using the weather forecast for the day and a history of past amounts of solar radiation measured in the area of the consumer's residence, and transmits the predicted values via the Internet once a day at 00:00.

The energy supplier 208 supplies purchased power at the demand of the power distribution device 205 installed in the consumer's residence. Additionally, when reverse power is input into the power distribution device 205, the energy supplier 208 transmits that power via the power grid to other consumer residences.

The electric load 206 is an electric load inside the consumer's residence, and refers to appliances such as televisions, air conditioners, refrigerators, washing machines, or lights which operate by using power supplied from the power distribution device 205. Furthermore, the sum total of the power used by these appliances is defined herein as load power.

The heat pump 201 (heat generation unit) is an air-source heat pump which causes an exchange of heat between a refrigerant ($CO_2$ for example) and water using a condenser (not shown in the drawings), thereby generating high temperature hot water. The hot water supply tank 202 (heat storage unit) stores the hot water generated by the heat pump 201 and is used as a buffer to provide the heat needed to keep a constant ambient temperature when, for example, outside temperature abruptly decreases. The hot water supply device 203 (radiator unit) supplies hot water supplied from the hot water supply tank 202. Here, the combination of the heat pump 201, the hot water supply tank 202, and the hot water supply device 203 is referred to as the heat pump hot water supply device 200.

As shown in FIG. 1, the operation planning device 210 designs an operation plan for the heat pump hot water supply device 200 which reduces the amount of reverse power and controls operation thereof. Next, details with respect to the configuration of the operation planning device 210 will be described with reference to FIG. 3. As shown in FIG. 2, the operation planning device 210 includes a storage unit 301, a load prediction unit 302, an operation planning unit 303, and an operation control unit 304.

The storage unit 301 stores the amount of load power consumed per hour by the electric load 206, the amount of hot water supply heat consumed per hour by the heat pump hot water supply device 200, the amount of PV-generated power generated per hour by the photovoltaic device 211, and the amount of solar radiation per hour which is a current value of an amount of solar radiation.

Any unit of storage capable of recording data may be used as the storage unit 301, such as dynamic random access memory (DRAM), synchronous dynamic random access memory (SDRAM), flash memory, or ferrodielectric memory.

The load prediction unit 302 calculates the predicted amount of load power to be consumed per hour by the electric load 206, the predicted amount of hot water supply heat to be consumed per hour by the heat pump hot water supply device 200, and the predicted amount of PV-generated power to be generated per hour by the photovoltaic device 211.

The operation planning unit 303 designs an operation plan for the heat pump hot water supply device 200 which minimizes the amount of reverse power, and calculates the control parameters which control the operation of the heat pump hot water supply device 200. Lastly, the operation control unit 304 controls the operation of the heat pump hot water supply device 200 based on control parameters.

(Storage Unit)

First, the storage unit 301 stores values corresponding to the consumer's amount of load power, amount of hot water supply heat, amount of PV-generated power, and amount of solar radiation. More specifically, as shown in the history table in FIG. 14, the storage unit 301 stores, for a predetermined period of time only (four weeks in the example shown in FIG. 14), a value of load power measured per hour (amount of load power) in a load power history, a value of an amount of hot water supply heat measured per hour in a hot water supply heat history, a value of PV-generated power measured per hour (amount of PV-generated power) in a PV-generated power history, and a value of an amount of solar radiation measured per hour in a solar radiation history. History information (load power, amount of hot water supply heat, PV-generated power, and amount of solar radiation) for each day of the week for four weeks is stored in this history table. Information for each hour of each day is further stored in more detail. The numbers 0, 1, 2, and so on represent the hours of the day 00:00, 01:00, 02:00, and so on. Moreover, the history information for the hours of the day is accumulated information. The load power history for the hour 0 is an accumulated amount of load power for the hour 00:00.

The load prediction unit 302 is set up to be able to obtain desired information from the storage unit 301, such as the amount of load power for 15:00 to 16:00 from the previous week, or the amount of hot water supply heat for 18:00 to 22:00 from two weeks ago, for example. The same is also true for the PV-generated power and the amount of solar radiation as well.

The operation planning device 210 obtains the amount of load power and the amount of PV-generated power from the power distribution device 205, the amount of hot water supply heat from the heat pump hot water supply device 200, and the amount of solar radiation from the offsite server 209 via the Internet. Here, the amount of solar radiation is an amount of solar radiation for the consumer's area of the residence.

The amount of hot water supply heat refers to an amount of heat consumed (radiated) per hour by the heat pump hot water supply device 200. The amount of load power refers to an amount of power consumed per hour by the electric load 206. The amount of PV-generated power refers to an amount of power generated per hour by the photovoltaic device. The amount of solar radiation refers to a current amount of solar radiation per unit area for the consumer obtained from the server 209.

Moreover, the operation planning device 210 accumulates each piece of information in one hour units obtained throughout the previous day and stores values for the previous four weeks (28 days) in the storage unit 301.

(Load Prediction Unit)

The load prediction unit 302 calculates a predicted value of the amount of load power to be consumed per hour by the electric load 206 (predicted amount of load power), a predicted value of the amount of hot water supply heat to be consumed per hour by the heat pump hot water supply device 200 (predicted amount of hot water supply heat), and a predicted value of the amount of PV-generated power to be generated per hour by the photovoltaic device 211 (predicted amount of PV-generated power).

The load prediction unit 302 predicts the amount of load power and the amount of hot water supply heat for each time period to be equivalent to the average of the power consumption values stored in the storage unit 301 measured over four previous weeks from a corresponding time period on the same day of the week. For example, when predicting the amount of load power and the amount of hot water supply heat from 19:00 to 20:00 on a Tuesday, the load prediction unit 302 obtains values measured from 19:00 to 20:00 on Tuesday over four previous weeks from the storage unit 301, and uses the average of those values as the predicted value.

The load prediction unit 302 obtains the predicted amount of solar radiation for each time period for the prediction target day from the server 209 via the Internet. The load prediction unit 302 then, for each time period, predicts the amount of PV power to be generated to be equivalent to, from among previously measured amounts of PV-generated power, the amount of PV-generated power from the time period having an amount of solar radiation that is closest to the predicted amount of solar radiation. That is, the load prediction unit 302 searches the solar radiation history stored in the storage unit 301 for a time period having a value that is the same as or closest to the predicted amount of solar radiation, then obtains the amount of PV-generated power measured for that time period from the PV-generated power history, and makes the obtained amount of PV-generated power the predicted amount of PV-generated power for the target time period.

The load prediction unit 302 performs the prediction process described above once a day at 00:00, and calculates a predicted value for each hour for 24 hours.

(Operation Planning Unit)

The operation planning unit 303 designs an operation plan for the heat pump hot water supply device 200 which minimizes the amount of reverse power, and calculates the control parameters for the heat pump hot water supply device 200.

According to the first embodiment, the operation planning unit 303 obtains the predicted amount of load power, the predicted amount of hot water supply heat, and the predicted amount of PV-generated power from the load prediction unit 302. The operation planning unit 303 further obtains from the heat pump hot water supply device 200 the hot water supply temperature setting (the current temperature setting) thereof. The operation planning unit 303 performs an operation plan designing process once a day at, for example, 00:00.

First, for each time period (00:00, 01:00 . . . 22:00, 23:00), the operation planning unit 303 calculates the predicted amount of reverse power by subtracting the predicted amount of load power from the corresponding predicted amount of PV-generated power. The lower limit of the predicted amount of reverse power is zero. In the evening, the predicted amount of PV-generated power becomes zero, and reverse power is not generated. The time when the predicted amount of reverse power for each time period first becomes zero counting backwards from 24:00, in other words, the time at which the predicted amount of reverse power changes from a positive value to a non-positive value, is defined as the reverse flow standby start time.

Next, FIG. 4 will be explained in detail. The horizontal axis represents time, and the vertical axis represents amount of power. The black diamonds represent the predicted amount of load power, the shaded squares represent the predicted amount of PV-generated power, and the black triangles represent the predicted amount of reverse power. The predicted amount of reverse power (black triangle) is yielded by subtracting the predicted amount of load power from the predicted amount of PV-generated power. Each amount of power for a given time is represented as an accumulated value. For example, if the time is 12:00, the amount of power shown for 12:00 (from 12:00 to 13:00) is an accumulated amount.

Figure 4:
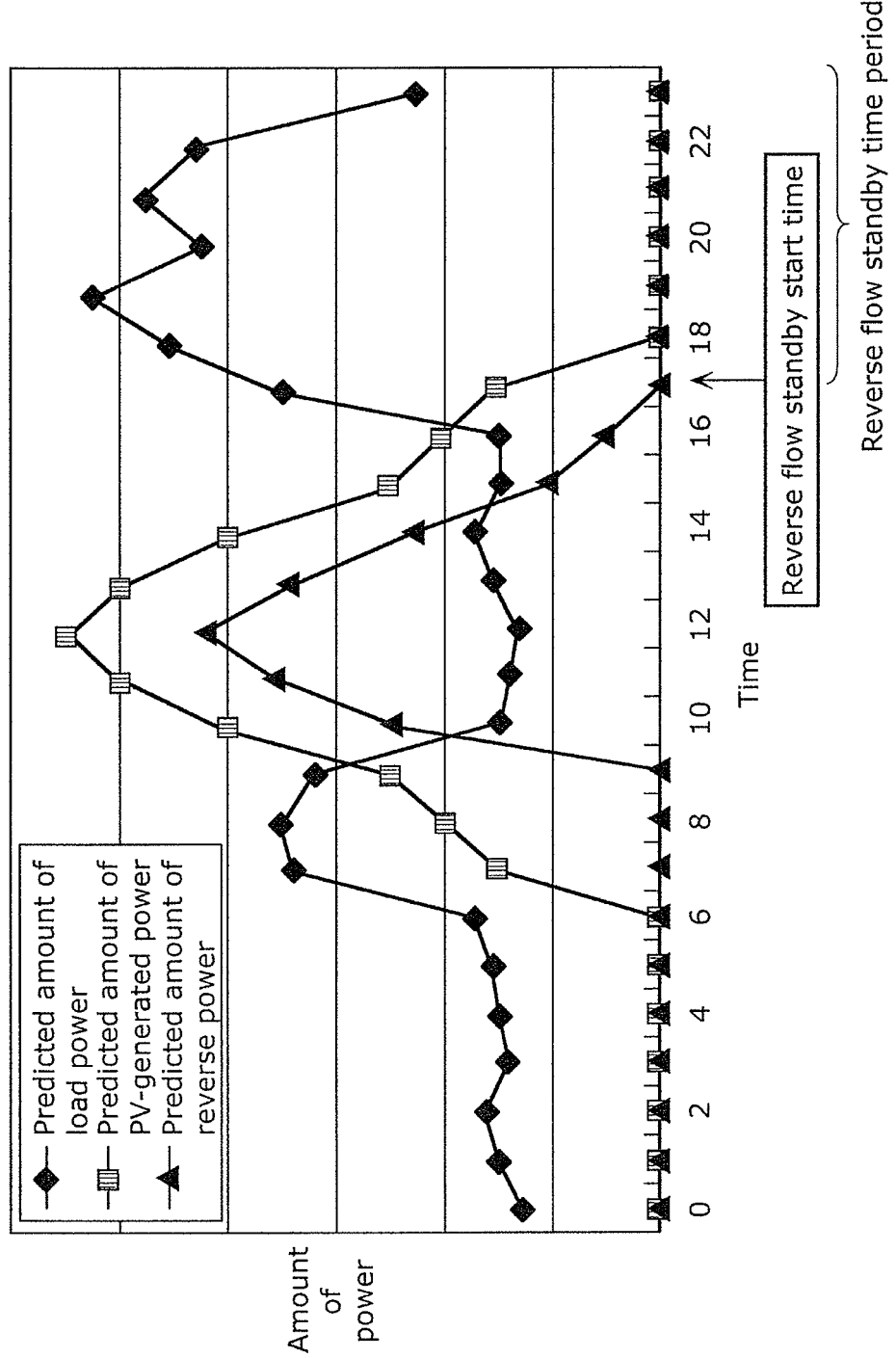
FIG. 4 is a graph showing a predicted amount of load power, a predicted amount of photovoltaic generated power (hereinafter also referred to as predicted amount of PV-generated power), and a predicted amount of reverse power for each time.

As shown in FIG. 4, the reverse flow standby start time, the time at which the predicted amount of reverse power becomes zero, is 17:00. When the amount of heat obtained by accumulating each predicted amount of hot water supply heat (amount of heat to be radiated in reverse flow standby) from the reverse flow standby start time of 17:00 to 24:00 (reverse flow standby time period) is stored in the hot water supply tank 202 by the reverse flow standby start time in advance using the reverse power, heating the hot water supply tank 202 after the reverse flow standby start time becomes unnecessary, thereby avoiding consumption of extra power. The predicted amount of hot water supply heat can be calculated, for example, by obtaining the amounts of hot water supply heat from the same day of the week measured between 17:00 and 24:00 over four weeks from the hot water supply heat history and averaging the amounts.

The temperature calculated by dividing this accumulated predicted amount of hot water supply heat for the time period between 17:00 and 24:00 by the capacity of the hot water supply tank 202 (for example 200 L) is set as the heat storage target temperature. In short, the heat pump 201 to generates heat so that the hot water supply tank 202 can reach this heat storage target temperature. In other words, the heat pump 201 stops generating heat when the hot water supply tank 202 reaches this temperature.

There are cases when an upper temperature limit is set for the heat stored in the hot water supply tank 202. If the heat storage target temperature exceeds this upper temperature limit, the heat storage target temperature setting is replaced by the upper temperature limit. Here, the upper temperature limit for the heat stored in the hot water supply tank 202 is set to 80° C.

The amount of heat to be stored in the hot water supply tank 202 in reverse flow can be calculated from the heat storage target temperature and the current temperature setting of the heat pump hot water supply device 200 (hot water supply temperature setting). The amount of heat to be generated in reverse flow, which is the amount of heat generated by the heat pump 201 during the reverse flow of power and stored in the hot water supply tank 202, is calculated using Equation 1 described below. This amount of heat to be generated in reverse flow is equivalent to the amount of heat to be radiated in reverse flow standby which is radiated by the hot water supply device 203 during the reverse flow standby time period (from 17:00 to 24:00).

amount of heat to be generated in reverse flow=(heat storage target temperature−hot water supply temperature setting)×hot water supply tank capacity  (Equation 1)

Next, the operation planning unit 303 calculates the reverse flow heat generation time, which is the amount of time required for the heat pump 201 to generate the amount of heat to be generated in reverse flow, using Equation 2 described below.

Also, the HP average capacity is 9 kW. The HP average capacity is an average heating capacity of the heat pump 201, and is a value that is saved in advance. The scaling ratio for converting from amount of heat (kcal) to power (kW) is 0.86.

reverse flow heat generation time=(amount of heat to be generated in reverse flow/0.86/1000)/HP average capacity  (Equation 2)

Next, as shown in FIG. 5, the operation planning unit 303 calculates the predicted amount of reverse power for each time period. FIG. 5 expresses the values from the graph in FIG. 4 in table form. The predicted amount of reverse power for any given time period is expressed as an accumulated value of that time period. For example, in the case of the time 00:00, as previously stated, the value expressed is an accumulated value of the predicted reverse power between 00:00 and 01:00. Also, priority in FIG. 5 is assigned in descending order by predicted amount of reverse power.

Next, the operation planning unit 303 determines the operation period which is the time period the heat pump 201 operates, and the reverse power threshold value which is for determining when the heat pump 201 actually begins generating heat. The operation period includes the time period having the largest predicted amount of reverse power. Specifically, the operation planning unit 303 selects, as the operation period, a number of one or more time periods in descending order of amount of reverse power (that is, in descending order of priority) until the selection exceeds the reverse flow heat generation time. The reverse power threshold value is equal to the value of the operation period with the smallest amount of reverse power.

For example, when the reverse flow heat generation time is calculated to be 0.5 hours, the time period in FIG. 5 with the highest priority (12:00) is selected as the operation period. In this case, the heat storage start time reverse power is 1.68 kW. However, when the reverse flow heat generation time is calculated to be 3.2 hours, the time is rounded up and time periods totaling 4 hours are acquired. In short, the operation period becomes the time period from 10:00 through 13:00, or in other words, the four time periods with the priorities 1 through 4. In this case, the heat storage start time reverse power is 1.00 kW.

The operation planning unit 303 then transmits the determined heat storage target temperature, the operation period, and the reverse power threshold value as control parameters to the operation control unit 304.

(Operation Control Unit)

The operation control unit 304 controls the operation of the heat pump hot water supply device 200 based on the control parameters generated by the operation planning unit 303. The operation control unit 304 obtains, the reverse power threshold value, the operation period, and the heat storage target temperature for the hot water supply tank 202 from the operation planning unit 303, obtains the current amount of load power and the current amount of PV-generated power from the power distribution device 205, and obtains the current temperature of the hot water supply tank 202 (hot water supply tank temperature) from the heat pump hot water supply device 200. The operation control unit 304 calculates the reverse power by subtracting the load power from the PV-generated power. These processes are performed, for example, every minute.

Even if it is mid-operation period, operation of the heat pump 201 will not be started if the calculated current reverse power is short of the reverse power threshold value. Once the calculated current reverse power reaches or exceeds the reverse power threshold value, operation of the heat pump 201 will be started. Moreover, because the operation control unit 304 obtains the temperature of the hot water supply tank 202 in one minute intervals, operation of the heat pump 201 is stopped when the hot water supply tank 202 reaches the heat storage target temperature.

By operating the heat pump 201 according to the operation plan designed by the operation planning device 210 in a time period with the peak amount of reverse power, the reverse power for that time period can be reduced (peak-cut). As a result, the effect power flowing in reverse has on the power grid can be effectively reduced. Moreover, the amount of heat to be radiated in reverse flow standby predicted to be needed after the reverse flow standby start time (17:00 in FIG. 4) can be provided with natural energy. As a result, energy can be saved as there is no need to purchase power from the energy supplier 208.

(Operation of the First Embodiment)

Hereinafter, an exemplary operation according to the first embodiment of the heat pump hot water supply system is described. The description will be given on the premise that the current time is 00:00, and the heat pump hot water supply system has been operating for 4 weeks (28 days) or more. The hot water supply temperature setting is set to 45° C. Also, the temperature inside the hot water supply tank 202 at 00:00 is an even 50° C.

(Update Process of the Operation Planning Device at 00:00)

Figure 6:
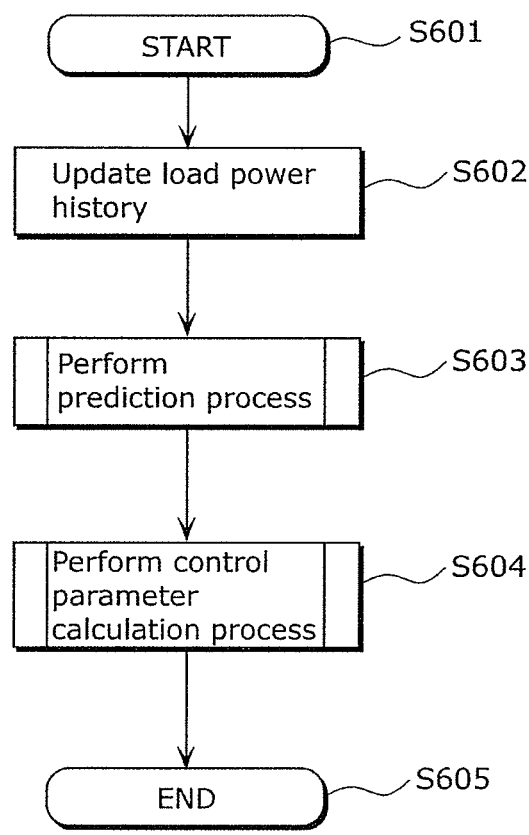
FIG. 6 is a flowchart of an operation planning process.

FIG. 6 is a flowchart of an operation planning process performed by the operation planning device 210 every day at 00:00. First, when the current time becomes 00:00, the operation planning device 210 begins the once daily operation planning process (S601).

Next, the operation planning device 210 updates the storage unit 301 (S602). The amount of load power, the amount of hot water supply heat, the amount of PV-generated power, and the amount of solar radiation for the past 24 hours are newly added to the storage unit 301 as hourly accumulated values.

Moreover, because the heat pump hot water supply system has been operating over the past 28 days or more, the load power history, the hot water supply heat history, the PV-generated power history, and the solar radiation history for 28 days are stored in the storage unit 301 in one hour units. Each history is updated by discarding the oldest days worth of data from each history, then adding the most recent days worth of data to each history.

Figure 7:
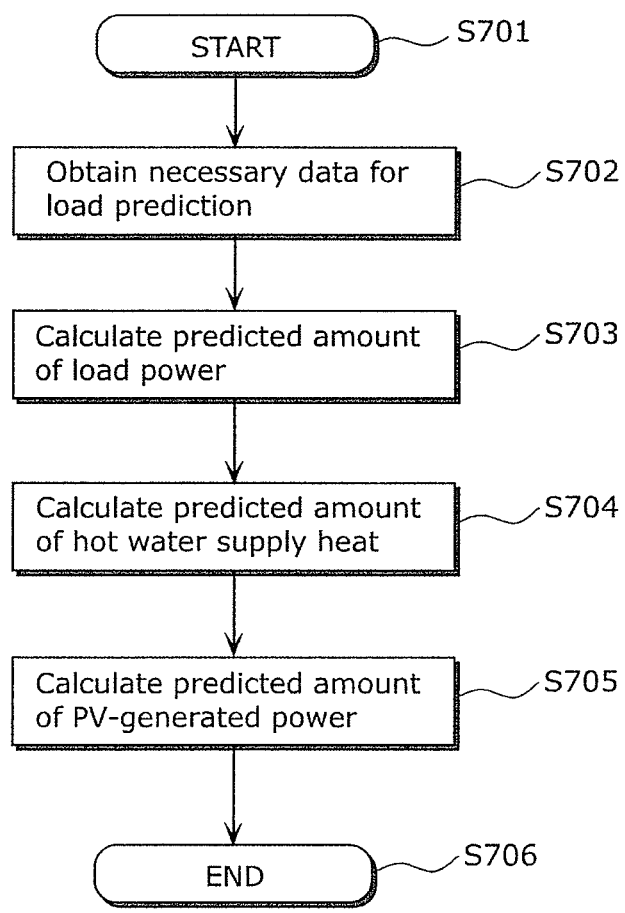
FIG. 7 is a flowchart of a load prediction process.

Next, the operation planning device 210 performs a prediction process using the load prediction unit 302 (S603). FIG. 7 is a flowchart of the prediction process performed by the load prediction unit 302 (S603). First, the load prediction unit 302 begins the prediction process (S701).

Next, the load prediction unit 302 obtains data necessary for load prediction (S702). The load prediction unit 302 obtains the predicted amount of solar radiation from the server 209 as well as necessary data from the load power history, the hot water supply heat history, the PV-generated power history, and the solar radiation history for the past 28 days stored in the storage unit 301.

Next, the load prediction unit 302 calculates the predicted amount of load power for each hour (S703). As previously stated, the load prediction unit 302 calculates the predicted amount of load power for each time period for a 24 hour period by obtaining, from the load power history, four amounts of load power from the same time period and day of the week as the prediction target day, and setting the predicted value as the average of the four obtained amounts.

Next, the load prediction unit 302 calculates the predicted amount of hot water supply heat (S704). As previously stated, the load prediction unit 302 calculates the predicted amount of hot water supply heat for each time period for a 24 hour period by obtaining, from the hot water supply heat history, four amounts of hot water supply heat from the same time and day of the week as the prediction target day, and setting the predicted value as the average of the four obtained amounts.

Next, the load prediction unit 302 calculates the predicted amount of PV-generated power (S705). As previously stated, the load prediction unit 302 searches the solar radiation history for a time period having a value that is the same as or closest to the per hour predicted amount of solar radiation. Then, the load prediction unit 302 calculates the predicted amount of PV-generated power for each time period a 24 hour period by obtaining, from the PV-generated power history, an amount of PV-generated power corresponding to the found time period, and setting that value as the predicted value.

This completes the load prediction process (S603) of the load prediction unit 302 (S706).

(Operation Planning Unit)

Figure 8:
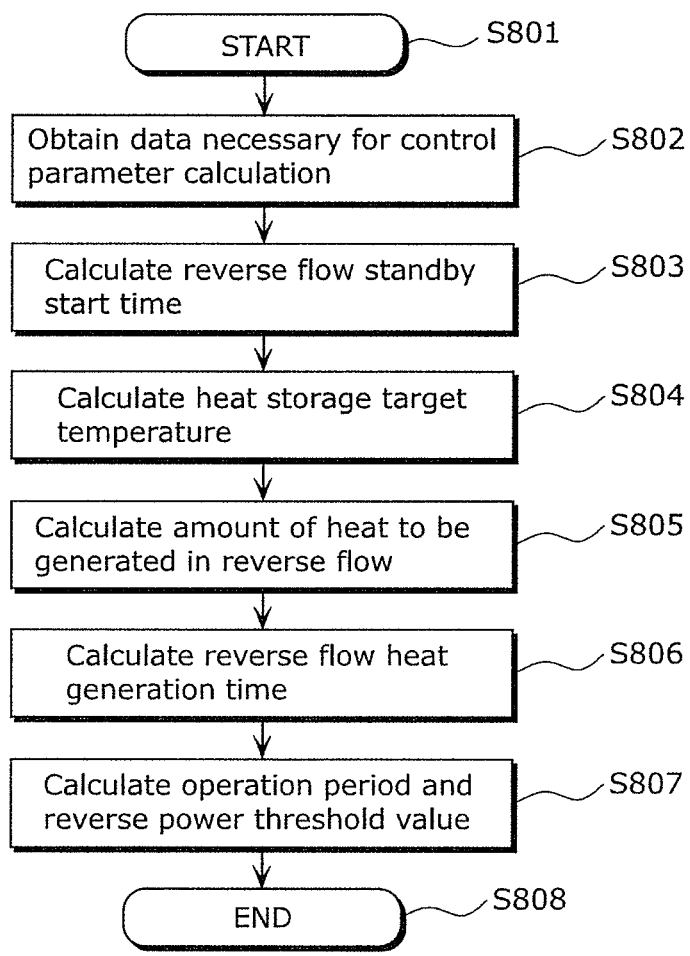
FIG. 8 is a flowchart of a control parameter calculation process in the operation planning unit.

Next, the operation planning device 210 performs a control parameter calculation process using the operation planning unit 303 (S604). FIG. 8 is a flowchart of the control parameter calculation process performed by the operation planning unit 303 (S604). First, the operation planning unit 303 begins the control parameter calculation process (S801).

Next, the operation planning unit 303 obtains data necessary for the control parameters (S802). The operation planning unit 303 obtains the hot water supply temperature setting from the heat pump hot water supply device 200, and obtains the predicted amount of load power, the predicted amount of hot water supply heat, and the predicted amount of PV-generated power from the load prediction unit 302.

Next, the operation planning unit 303 calculates the reverse flow standby start time (S803). As previously stated, the operation planning unit 303 calculates the predicted amount of reverse power, which is a value with a lower limit of zero, by subtracting the predicted amount of load power from the predicted amount of PV-generated power.

As shown in the example in FIG. 4, because the predicted amount of PV-generated power becomes zero from the evening on and reverse power is not generated, the time when the value of the predicted amount of reverse power for each time period first becomes zero counting backwards from 24:00 is set as the reverse flow standby start time. For example, the reverse flow standby start time in the example in FIG. 4 is 17:00.

Next, the operation planning unit 303 calculates the heat storage target temperature (S804). As previously stated, the operation planning unit 303 sets the heat storage target temperature as the lower of the upper temperature limit of the hot water supply temperature setting (80° C.) and the temperature calculated by dividing the amount of heat obtained through accumulating the predicted amount of hot water supply heat between the reverse flow standby start time and 24:00 by the capacity of the hot water supply tank 202 (200 L).

For example, when the amount of heat obtained by accumulating the predicted amount of hot water supply heat between the reverse flow standby start time and 24:00 is 15000 kcal, the temperature calculated by dividing this by the 200 L tank capacity is 75° C. Thus, because 75° C. is lower than the upper temperature limit of the hot water supply temperature setting (80° C.), the heat storage target temperature will be set to 75° C.

Next, the operation planning unit 303 calculates the amount of heat to be generated in reverse flow (S805). The operation planning unit 303 calculates the amount of heat to be generated in reverse flow which is the amount of heat to be generated by the heat pump 201. This amount of heat to be generated in reverse flow is equivalent to the amount of heat to be radiated in reverse flow standby.

For example, using Equation 1, when the heat storage target temperature of the hot water supply tank 202 is 75° C. and the hot water supply temperature setting is 45° C., the amount of heat to be generated in reverse flow is calculated to be 6000 kcal.

Next, the operation planning unit 303 calculates the reverse flow heat generation time (S806). As previously described, the operation planning unit 303 uses Equation 2 to calculate the reverse flow heat generation time, which is the amount of time required for the heat pump 201 to generate the amount of heat to be generated in reverse flow. For example, using Equation 2, the reverse flow HP heat generation time is calculated to be 0.78 hours with respect to the value calculated above (6000 kcal).

Next, the operation planning unit 303 calculates the operation period and the reverse power threshold value (S807). As previously described, the operation planning unit 303 selects, as the operation period, a number of one or more time periods in descending order of predicted amount of reverse power until the selection exceeds the reverse flow heat generation time. Moreover, the predicted amount of reverse power among the one or more selected time periods included in the operation period with the lowest value is set as the reverse power threshold value. For example, if the result of arranging the predicted amount of reverse power in descending order is like the example shown in FIG. 5, when the calculated reverse flow heat generation time is 0.78 hours, time period 12:00 having a reverse power threshold value of 1.68 kW is selected as the operation period.

With the above processes, the operation planning unit 303 completes (S808) the control parameter calculation process (S604), and the operation planning device 210 completes (S605) the operation planning process.

The operation planning device 210 performs an operation control process of the heat pump hot water supply device 200 using the operation control unit 304 in one minute intervals during the time period from the completion of the operation planning process until 00:00 of the next day.

After the completion of the operation planning process, the operation control unit 304 obtains the heat storage target temperature, the operation period, and the reverse power threshold value from the operation planning unit 303, and obtains the load power and the PV-generated power in one minute intervals from the power distribution device 205, and obtains the temperature of the hot water supply tank 202 in one minute intervals from the heat pump hot water supply device 200. Each time information is obtained per minute, the operation control unit 304 calculates the reverse power by subtracting the load power from the PV-generated power.

Even if it is mid-operation period, operation of the heat pump 201 will not be started if the calculated current reverse power is short of the reverse power threshold value. Once the calculated current reverse power reaches or exceeds the reverse power threshold value, operation of the heat pump 201 will be started. Moreover, because the operation control unit 304 obtains the temperature of the hot water supply tank 202 in one minute intervals, operation of the heat pump 201 is stopped when the hot water supply tank 202 reaches the heat storage target temperature.

Moreover, the operation planning device 210 performs a process in which each of the various pieces of information is stored in predetermined time intervals in the storage unit 301 during the time period from the completion of the operation planning process until 00:00 of the next day. The amount of hot water supply heat obtained from the heat pump hot water supply device 200, the amount of load power obtained from the power distribution device 205, the amount of PV-generated power obtained from the photovoltaic device 211, and the amount of solar radiation obtained from the server 209 are stored in the storage unit 301.

The obtained respective values are accumulated hourly, and when the time changes according to the time information stored internally, the accumulated values for the past hour coupled with the time are stored in the storage unit 301, whereby the accumulated value is reset to 0.

According to the first embodiment, using the operation planning unit 303, the operation planning device 210 stores an amount of heat in the hot water supply tank 202 at the reverse flow standby start time that corresponds to the predicted amount of hot water supply heat between the reverse flow standby start time and 24:00 based on the prediction information from the load prediction unit 302.

On a day having a low predicted amount of hot water supply heat, for instance, radiant heat loss occurs when the hot water supply tank 202 is heated to the set upper temperature limit (80° C.) in order to use up all of the reverse power. However, according to the first embodiment, because a necessary amount of heat is predicted, heat which would go to waste is not generated, and a low-energy performance characteristic is maintained.

Following the configuration according to the present invention as outlined above allows for a low-energy performance characteristic to be maintained whereby the amount of reverse power generated is reduced in the system including the photovoltaic device 211 and the heat pump hot water supply device 200.

Second Embodiment

Heat Pump Hot Water Supply and Heating Device

In the description of the first embodiment, the heat pump hot water supply was explained, but the system according to the second embodiment is a heat pump hot water supply and heating system which includes, in addition to the hot water supply device, an internal heating device having a heating function.

Figure 9:
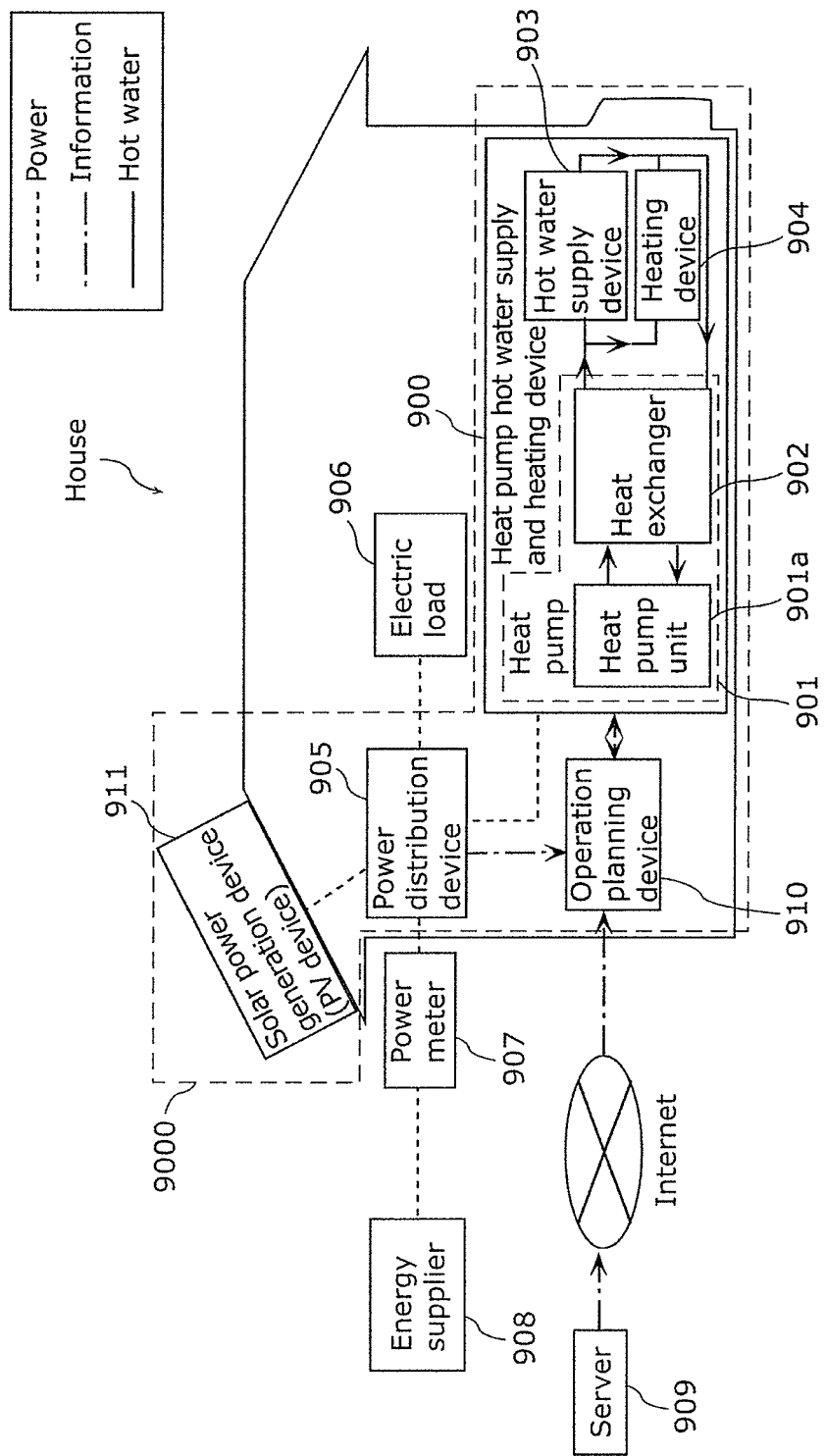
FIG. 9 is a block diagram of the heat pump hot water supply and heating system including the power generation device according to the second embodiment.

FIG. 9 is a block diagram explaining a heat pump hot water supply and heating system 9000 including the power generation device. As shown in FIG. 9, the heat pump hot water supply and heating system 9000 according to the second embodiment includes a heat pump hot water supply and heating device 900, a power distribution device 905, a electric load 906, an operation planning device 910, and a photovoltaic device 911. The power distribution device 905 is connected to an energy supplier 908 via a power meter 907, and the operation planning device 910 is connected to a server 909 via the Internet.

While the configuration of the second embodiment is similar to the configuration of the first embodiment, the system according to the second embodiment differs in that in addition to a hot water supply device 903, the heat pump hot water supply and heating device 900 is equipped with a heating device 904. That is, the heat pump hot water supply and heating device 900 includes a heat pump 901, a heat exchanger 902, the hot water supply device 903, and the heating device 904.

Figure 15:
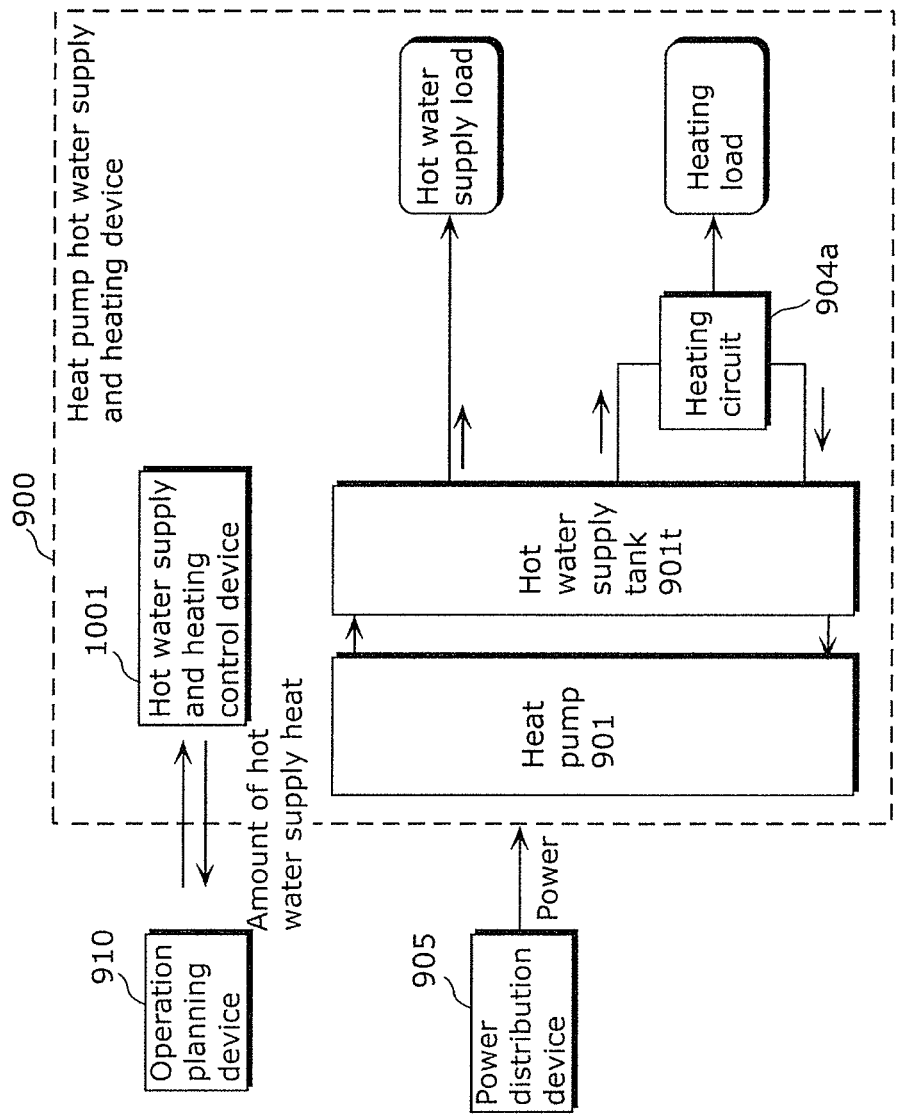
FIG. 15 is a block diagram of the heat pump hot water supply and heating system including the power generation device according to the second embodiment.

Moreover, as is shown by the heat pump hot water supply and heating device 900 in FIG. 15, a simplified configuration in which all of the heat generated by the heat pump 901 is stored in a hot water supply tank 901t and heat is supplied to a hot water supply load from the hot water supply tank 901t and to a heating load from a heating circuit 904a is also acceptable. In other words, a system in which heat is supplied to both the hot water supply load and the heating load by the hot water supply tank 901t is acceptable.

Figure 11:
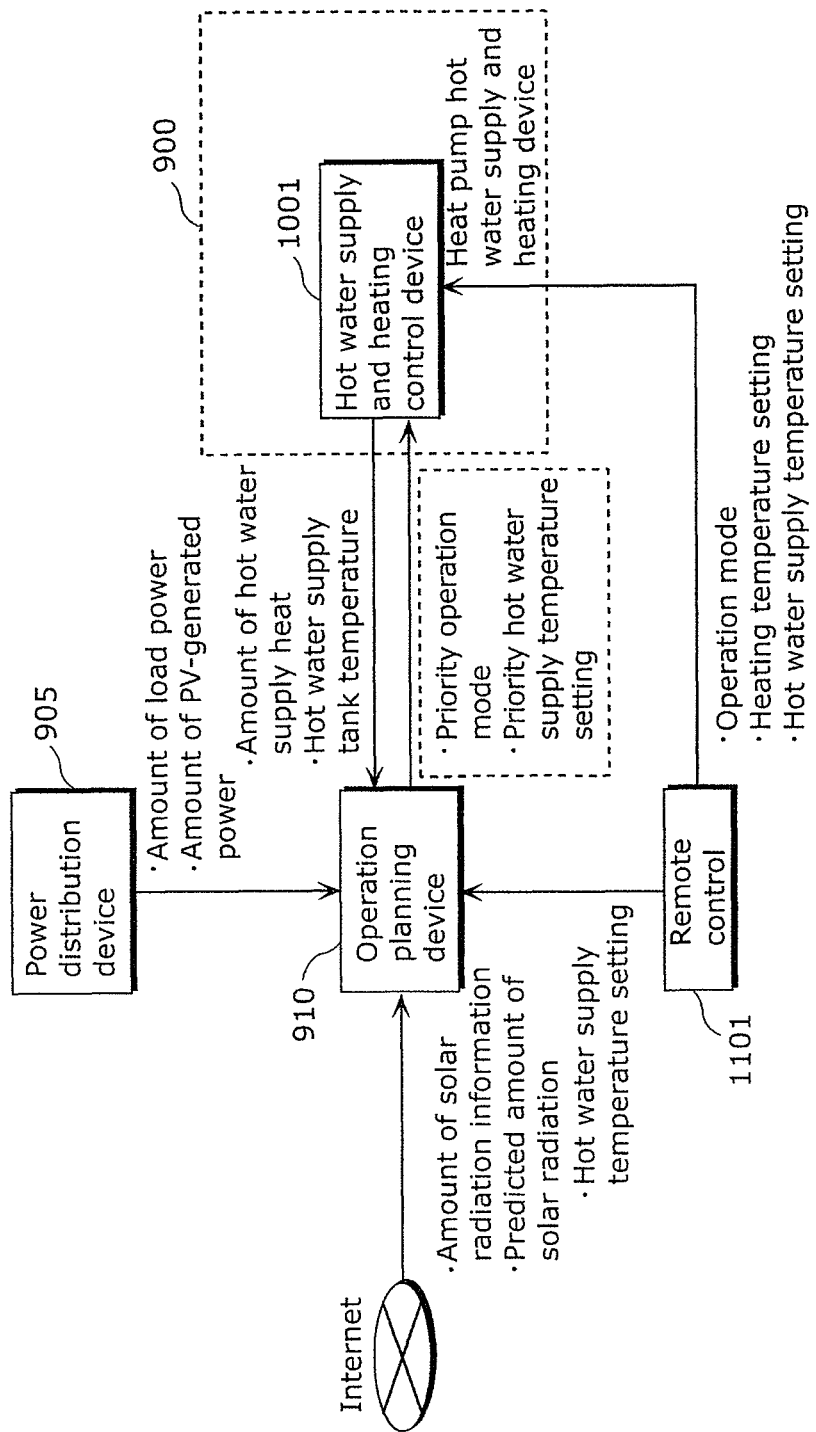
FIG. 11 is a block diagram of the heat pump hot water supply and heating system including the power generation device according to the second embodiment.
Figure 12:
FIG. 12 is a table showing remote control setting categories and setting information.

Moreover, as shown in FIG. 11, with the heat pump hot water supply and heating system 9000 according to the second embodiment, the consumer (user) can switch between hot water supply and heating, for example, by using a remote control 1101. As shown in FIG. 12, the remote control 1101 is equipped with functions to set the heat generated by the heat pump 901 to be used for heating ("heating") or for hot water supply ("hot water"), and to turn the heat pump 901 off ("off"). When the user sets the operation mode to any one of these settings, the remote control 1101 outputs the selected operation mode to a hot water supply and heating control device 1001. The user can also set the hot water supply temperature and the heating temperature with the remote control 1101. When the operation mode is set to "heating", the temperature of the water (hot water) to be put in the heating circuit 904a (to be described later) is set to be the heating temperature setting input by the user. On the other hand, when the operation mode is set to "hot water", the temperature inside a hot water supply tank 903a (to be described later) is set to be the hot water supply temperature setting input by the user.

Figure 10:
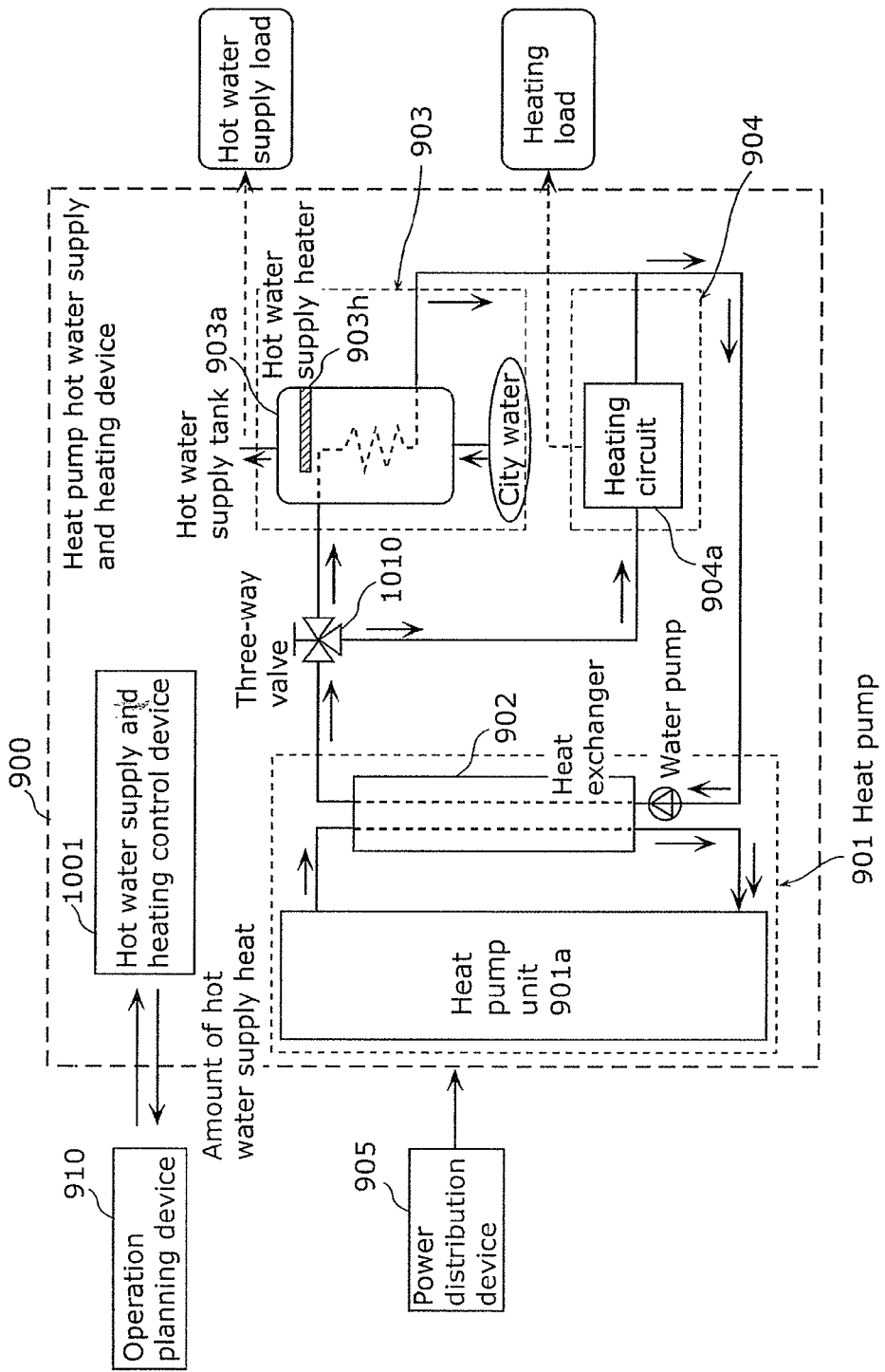
FIG. 10 is a block diagram of the heat pump hot water supply and heating device.

FIG. 10 is a block diagram explaining the details of the heat pump hot water supply and heating device 900. The heat pump hot water supply and heating device 900 mainly includes the hot water supply and heating control device 1001, the heat pump 901, the hot water supply device 903, the heating device 904, and a three-way valve 1010 (switching device). The heat pump 901 includes a heat pump unit 901a and the heat exchanger 902.

The heat pump unit 901a (not shown in the drawings) includes an evaporator which facilitates heat exchange between outside air and low temperature-low pressure liquid refrigerant to generate a low temperature-low pressure vaporized refrigerant, a motor-driven compressor which compresses the low temperature-low pressure vaporized refrigerant into a high temperature-high pressure vaporized refrigerant, a condenser which facilitates heat exchange between the high temperature-high pressure vaporized refrigerant and circulating water (thermal storage medium) to generate a low temperature-high pressure liquid refrigerant, an expansion valve which reduces the pressure of the low temperature-high pressure vaporized refrigerant to generate a low temperature-low pressure liquid refrigerant, and a fan to accelerate the heat conversion between the refrigerant in the evaporator and the outside air, for example.

The hot water supply tank 903a stores heat supplied by the hot water supply load. A hot water supply heater 903h is located inside the hot water supply tank 903a and heats the water therein. The heating circuit 904a is a channel of the heating apparatus for the hot water supplied by the heating load. The heat exchanger 902 facilitates heat exchange between the refrigerant heated by the heat pump unit 901a and the downstream water cycle filled with water. The three-way valve 1010 is a switching device for controlling the channel so the water heated by the heat exchanger 902 flows to one of the hot water supply tank 903a and the heating circuit 904a.

According to the second embodiment, the refrigerant used in the heat pump 901 is 410A refrigerant. As a result of a property of this refrigerant, the temperature at the exit the water cycle side of the heat exchanger 902 peaks at 55° C., so the upper temperature limit of the heating temperature setting is set to 55° C.

The hot water supply tank 903a is equipped with an internal heat exchanger coil. This heat exchanger coil is expressed as the dashed line inside the hot water supply tank 903a in FIG. 10. When the three-way valve 1010 is set to the channel for the hot water supply tank 903a, the water heated by the heat exchanger 902 flows through the heat exchanger coil and heats the water inside the hot water supply tank 903a. Because the temperature at the exit of the water cycle side of the heat exchanger 902 peaks at 55° C., when the temperature of the hot water supply tank 903a is 50° C. or higher, heat exchange via the each exchange coil is practically nonexistent.

For this reason, when the temperature of the water inside the hot water supply tank 202 is heated to 50° C. or higher, the water is heated by supplying electricity to the hot water supply heater 903h. Here, the capacity of the hot water supply tank 903a is 200 L, the heating capacity of the hot water supply heater 903h is 3 kW, and the upper temperature limit of the hot water supply temperature setting is 80° C.

In other words, the heat pump unit 901a can heat the water inside the hot water supply tank 903a to around 50° C. (the first temperature), and the hot water supply heater 903h can heat the water inside the hot water supply tank 903a beyond 50° C. (the second temperature). It should be noted that while water was given as an example of the thermal storage medium stored in the hot water supply tank 903a in the embodiments, the thermal storage medium is not limited to this example. Any type of thermal storage medium which changes in temperature in response to an amount of stored heat can be used.

The hot water supply and heating control device 1001 is a device which, based on set information, controls the entirety of the heat pump hot water supply and heating device 900 system. As shown in FIG. 11, the hot water supply and heating control device 1001 obtains operation information from the remote control 1101 and the operation planning device 910.

The hot water supply and heating control device 1001 obtains the operation mode, the heating temperature setting, and the hot water supply temperature setting from the remote control 1101 as operation information. The hot water supply and heating control device 1001 obtains the priority operation mode and the priority hot water supply temperature setting from the operation planning device 910 as operation information. The priority operation mode has priority over the operation mode obtained from the remote control 1101. Similarly, the priority hot water supply temperature setting has priority over the hot water supply temperature setting obtained from the remote control 1101. In other words, even if the hot water supply and heating control device 1001 obtains the operation mode from the remote control 1101, the priority operation mode from the operation planning device 910 is given priority when obtained.

As shown in FIG. 11, the hot water supply and heating control device 1001 transmits the amount of hot water supply heat and temperature information for the hot water supply tank to the operation planning device 910. As explained in FIG. 3, the operation planning device 910 receives information pertaining to the amount of load power and the amount of PV-generated power from the power distribution device 205. The operation planning device 910 is also set up to receive information pertaining to the amount of solar radiation and the predicted amount of solar radiation via the Internet.

When the operation mode is set to "heating", the hot water supply and heating control device 1001 switches the three-way valve 1010 to the heating circuit 904a channel, and when the operation mode is set to "hot water", the hot water supply and heating control device 1101 switches the three-way valve 1010 to the hot water supply tank 903a channel. When the operation mode is set to "stop", the three-way valve 1010 is left unchanged.

Moreover, when the operation mode is set to "heating", the hot water supply and heating control device 1001 switches on the heat pump unit 901a and brings the exit temperature of the heat exchanger 902 to the heating temperature setting by adjusting the number of rotations of the compressor and the diameter, for example, of the expansion valve in the heat pump unit 901a.

Moreover, when the temperature of the hot water supply tank 903a drops 5° C. or more below the hot water supply temperature setting (hot water supply temperature setting −5° C. or more), the water inside the hot water supply tank 903a is heated by supplying electricity to the hot water supply heater 903h. Once the temperature of the hot water supply tank 903a reaches or exceeds the hot water supply temperature setting, electricity to the hot water supply heater 903h is shut off.

Moreover, when the operation mode is set to "hot water" and the temperature inside the hot water supply tank 903a is 50° C. or below and 5° C. or more below the hot water supply temperature setting (hot water supply temperature setting −5° C. or more), the hot water supply and heating control device 1001 switches the three-way valve 1010 to the hot water supply tank 903a channel and controls the heat pump 901 to bring the exit temperature of the heat exchanger 902 to 55° C. This is because, as previously stated, when the temperature inside the hot water supply tank 903a is 50° C. or higher, heat exchange (heating) via the hot water supply tank 903a is practically nonexistent.

Moreover, when the temperature of the hot water supply tank 903a is 50° C. or higher and 5° C. or more below the hot water supply temperature setting (hot water supply temperature setting −5° C. or more), the water inside the hot water supply tank 903a is heated by supplying electricity to the hot water supply heater 903h. Once the temperature of the hot water supply tank 903a reaches or exceeds the hot water supply temperature setting, electricity to the hot water supply heater 903h is shut off.

Moreover, when the hot water supply and heating control device 1001 obtains the priority operation mode and the priority hot water supply temperature setting from the operation planning device 910, these settings have priority over the operation mode and hot water supply temperature setting settings input by the user with the remote control 1101. Therefore, the hot water supply and heating control device 1001 uses the priority operation mode obtained from the operation planning device 910 for the operation mode, and the priority hot water supply temperature setting obtained from the operation planning device 910 for the hot water supply temperature setting, and operates accordingly.

Figure 3:
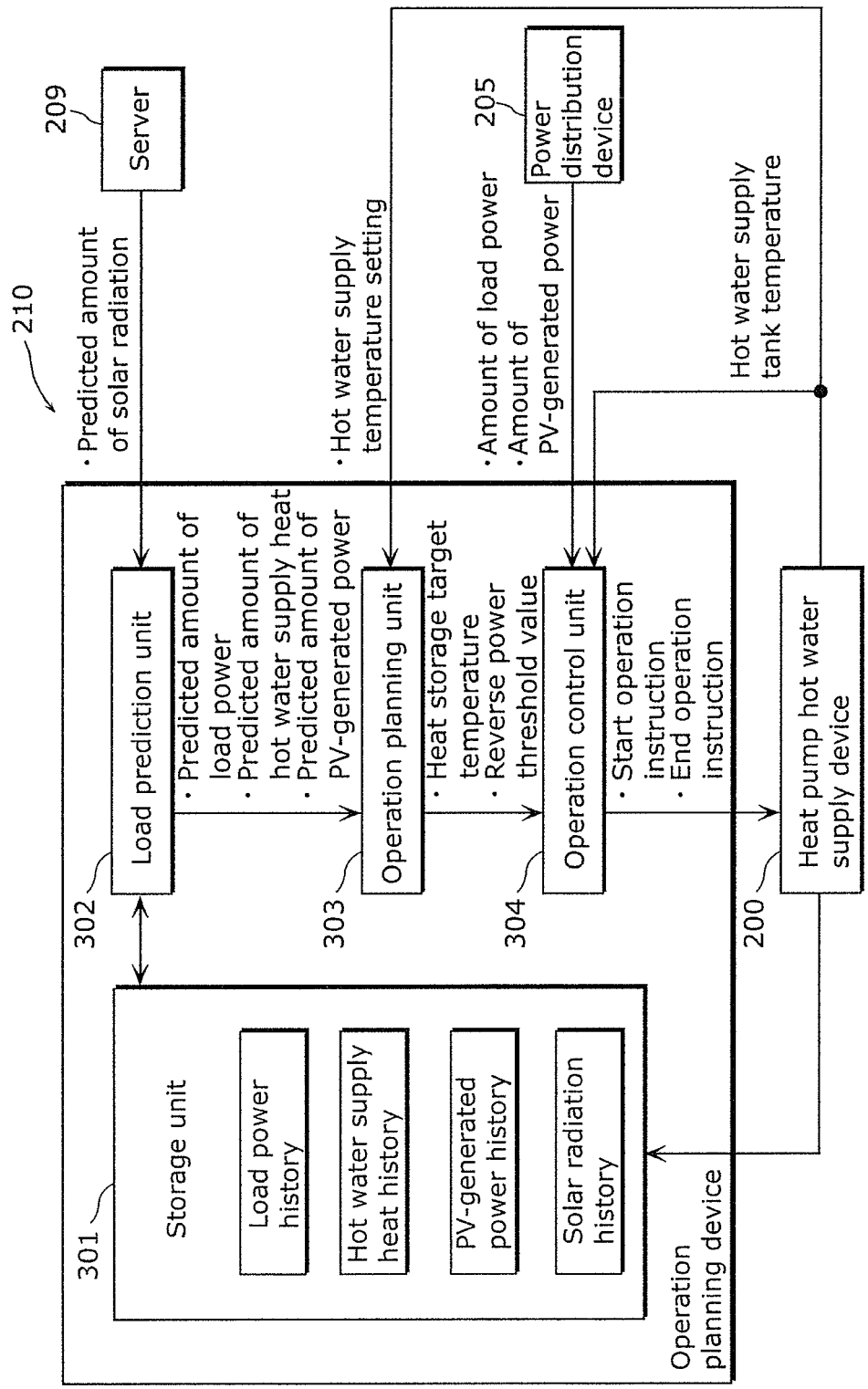
FIG. 3 is a block diagram of the operation planning device.

The operation of the operation planning device 910 is practically the same as the operation described in FIG. 3. The heat pump hot water supply and heating system 9000 according to the second embodiment is different from the first embodiment in that, as is shown in FIG. 10, after the heat exchanger 902 facilitates heat exchange, the channel is switchable between the hot water supply tank 903a and the heating circuit 904a via the three-way valve 1010. Moreover, because the heat exchanger 902 can only heat the hot water supply tank 903a to approximately 50° C., the hot water supply tank 903a is provided with the hot water supply heater 903h therein in order to heat itself beyond 50° C.

In other words, with respect to the amount of heat corresponding to the amount of heat to be radiated in reverse flow standby, the operation planning device 910 designs an operation plan to cause the heat pump unit 901a to generate an amount of heat until the temperature of the water inside the hot water supply tank 903a reaches 50° C., and cause the hot water supply heater 903h to generate an amount of heat after the temperature of the water reaches 50° C. The calculation method for determining the amount of heat required in reverse flow is described hereinafter.

(1) When the hot water supply temperature setting (the current temperature setting for the hot water supply tank 903a) is below 50° C.:

When the hot water supply temperature setting is below 50° C., the operation planning unit 303 uses Equation 3 below to calculate the reverse flow HP generated heat, which is an amount of heat to be generated by the heat pump 901 in reverse flow, and Equation 4 below to calculate the reverse flow heater generated heat, which is an amount of heat generated by the hot water supply heater 903h in reverse flow.

reverse flow HP generated heat=(50−hot water supply temperature setting)×hot water supply tank capacity    (Equation 3)

reverse flow heater generated heat=(heat storage target temperature−50)×hot water supply tank capacity    (Equation 4)

(2) When the hot water supply temperature setting (the current temperature setting for the hot water supply tank 903a) is 50° C. or higher:

When the hot water supply temperature setting is 50° C. or higher, the operation planning device 910 uses Equation 5 below to calculate the reverse flow heater generated heat, which is an amount of heat to be generated by the hot water supply heater 903h.

reverse flow heater generated heat=(heat storage target temperature−hot water supply temperature setting)×hot water supply tank capacity    (Equation 5)

Next, the operation planning unit 303 uses Equation 6 below to calculate the reverse flow HP heat generation time t(HP), which is the amount of time required for the heat pump 901 to generate the reverse flow HP generated heat, and Equation 7 below to calculate the reverse flow heater heat generation time t(HT), which is the amount of time required for the hot water supply heater 903h to generate the reverse flow heater generated heat.

It should be noted that the HP average capacity is 9 kW. The HP average capacity is an average heating capacity of the heat pump 901, and is a value that is saved in advance. Moreover, the heating capacity of the heater, which is the average heating capacity of the hot water supply heater 903h, is 3 kW. The scaling ratio for converting from amount of heat (kcal) to power (kW) is 0.86.

t(HP)=(reverse flow HP generated heat/0.86/1000)/HP average capacity    (Equation 6)

t(ht)=(reverse flow heater generated heat/0.86/1000)/heating capacity of the heater    (Equation 7)

Next, the operation planning unit 303 calculates the reverse flow heat generation time by adding the reverse flow HP heat generation time and the reverse flow heater heat generation time (t(HP)+t(HT)). The operation planning unit 303 designs the operation plan for the heat pump 901 from the calculated reverse flow heat generation time. Moreover, heating via the hot water supply heater 903h is done following the operation of the heat pump 901, but the operation plan is designed so operation of the hot water supply heater 903h is also stopped before the reverse flow standby start time.

(1) When the reverse power is below the reverse power threshold value:

Both priority operation mode and priority hot water supply temperature settings are obtained to be "absent". In this case, the heat pump hot water supply and heating system 9000 operates according to the settings received from the remote control 1101.

(2) When the reverse power is the same as or higher than the reverse power threshold value:

(i) When the temperature of the hot water supply tank is below 50° C.:

The priority operation mode is obtained to be "hot water", and the priority hot water supply temperature setting is obtained to be "heat storage target temperature". In this case, because the temperature can be reached with just the heating capacity of the heat pump 901, the heat pump hot water supply and heating device 900 sets the operation mode to "hot water" and uses the heat pump 901 to heat the water inside the hot water supply tank 903a.

(ii) When the temperature of the hot water supply tank is 50° C. or higher:

The priority operation mode is obtained to be "absent", and the priority hot water supply temperature setting is obtained to be "heat storage target temperature". In this case, because the temperature exceeds the heating capacity of the heat pump 901 (50° C.), the heat pump hot water supply and heating device 900 leaves the operation mode as received from the remote control 1101, and uses the hot water supply heater 903h to heat the water inside the hot water supply tank 903a. There is no other option but to use the hot water supply heater 903h to heat the water inside the hot water supply tank, even if the setting on the user remote control is "heating" or "hot water".

Specific Example

Hereinafter, an operation of the heat pump hot water supply and heating system 9000 according to the second embodiment is described. The description will be given on the premise that the current time is 00:00, and the heat pump hot water supply and heating system 9000 has been operating for 4 weeks (28 days) or more. Moreover, on the remote control 1101, the operation mode information is "heating", the heating temperature setting is "50° C.", and the hot water supply temperature setting is "45° C.". Also, the temperature inside the hot water supply tank 903*a* at 00:00 is an even 50° C.

First, when the hot water supply temperature setting is below 50° C., the operation planning unit 303 uses Equation 3 to calculate the reverse flow HP generated heat, which is the amount of heat to be generated by the heat pump 901, and Equation 4 to calculate the reverse flow heater generated heat, which is the amount of heat to be generated by the hot water supply heater 903*h*.

For example, when the heat storage target temperature is 75° C. and the hot water supply temperature setting is 45° C., because the hot water supply temperature setting is below 50° C., Equation 3 and Equation 4 are calculated to get a reverse flow HP generated heat of 1000 kcal and a reverse flow heater generated heat of 5000 kcal. For both Equation 3 and Equation 4, a storage tank capacity of 200 L was used.

Next, the operation planning unit 303 calculates the reverse flow heating time. The operation planning unit 303, as previously stated, uses Equation 6 to calculate the reverse flow HP heat generation time, which is the amount of time required for the heat pump 901 to generate the reverse flow HP generated heat, and Equation 7 to calculate the reverse flow heater heat generation time, which is the amount of time required for the hot water supply heater 903*h* to generate the reverse flow heater generated heat.

For example, with respect to the above calculated reverse flow HP generated heat and the reverse flow heater generated heat, the reverse flow HP heat generation time t(HP)=0.13 hr, and the reverse flow heater heat generation time t(HT)=1.94 hr.

Next, the operation planning unit 303 calculates the reverse flow heating time by adding the reverse flow HP heat generation time and the reverse flow heater heat generation time (t(HP)+t(HT)). For example, with respect to the above calculated t(HP) and t(HT), the reverse flow heating time is calculated to be 2.07 hr.

In this case, with respect to the figures in FIG. 5, the operation period is set to the time period from 11:00 through 13:00, or in other words, the time periods with the priorities 1 through 3, whereby the selected operation period with the lowest predicted amount of reverse power is set as the reverse power threshold value (1.38 kW).

Figure 16:
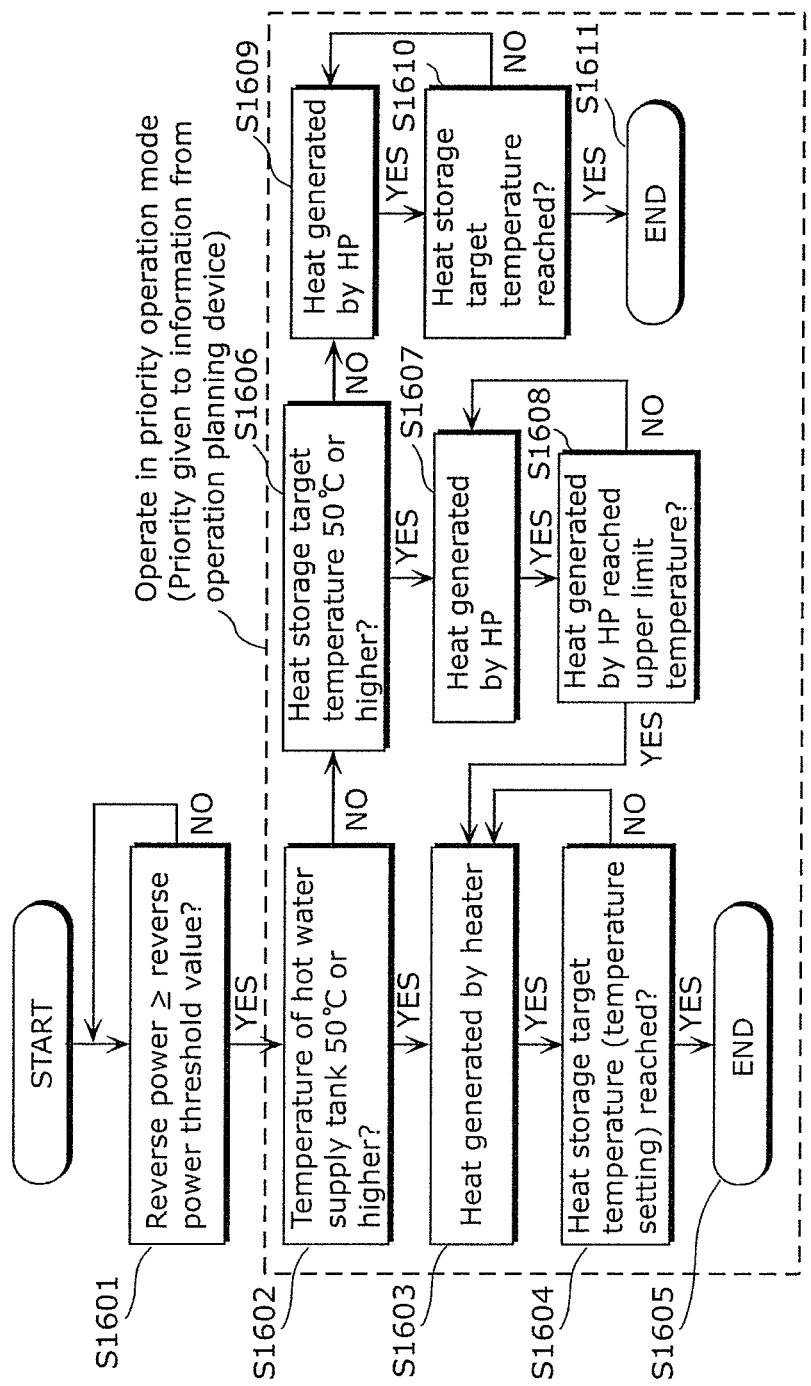
FIG. 16 is a flow chart showing an exemplary operation of the heat pump hot water supply and heating system according to the second embodiment.

Hereinafter, an operation of the heat pump hot water supply and heating device 900 according to the second embodiment is described. FIG. 16 is a flow chart showing an operation of the heat pump hot water supply and heating device 900.

First, the hot water supply and heating control device 1001 monitors the reverse power and starts the operation of the heat pump hot water supply and heating device 900 when the reverse power reaches or exceeds the reverse power threshold value (S1601). When the operation is started, if the temperature of the hot water supply tank (the current temperature of the hot water supply tank 903*a*) is 50° C. or above (S1602), heat is generated by the hot water supply heater 903*h* (S1603), and when the water inside the hot water supply tank 903*a* reaches the heat storage target temperature (S1604), the generation of heat via the hot water supply heater 903*h* is stopped (S1605).

In contrast, when the temperature of the hot water supply tank is below 50° C. (S1602), heat is first generated by the heat pump unit 901*a*. At this time, if the heat storage target temperature is below 50° C. (S1606), heat will only be generated by the heat pump unit 901*a* (S1609). When the water inside the hot water supply tank 903*a* reaches the heat storage target temperature (S1610), the generation of heat via the heat pump unit 901*a* is stopped (S1611).

However, if the heat storage target temperature is 50° C. or above (S1606), heat is generated by the heat pump unit 901*a* until the temperature of the water inside the hot water supply tank 903*a* reaches 50° C. (S1607). Furthermore, after the temperature of the water inside the hot water supply tank 903*a* reaches the upper temperature limit of 50° C. (S1608), heat is generated by the hot water supply heater 903*h* until the heat storage target temperature is reached (S1603). Once the water inside the hot water supply tank 903*a* reaches the heat storage target temperature (S1604), the generation of heat via the hot water supply heater 903*h* is stopped (S1605).

Hereinafter, an advantage of the heat pump hot water supply and heating system 9000 according to the second embodiment is described.

The operation planning device 910 according to the second embodiment predicts the amount of load power, the amount of hot water supply heat, and the amount of PV-generated power for each time period for the prediction target day, and designs an operation plan for heating the hot water supply tank 202 using reverse power based on the predicted information. The operation planning device 910 then selects, as the operation period, a number of one or more time periods in descending order of amount of reverse power, and sets the amount of reverse power with the lowest value among the selected time periods as the reverse power threshold value.

For example, as described above with respect to the figures in FIG. 5, when the reverse flow heat generation time is 2.07 hr, the operation period is the time period from 11:00 through 13:00. Because the predicted amount of reverse power is for 11:00, 12:00, and 13:00 is 1.44 kW, 1.68 kW, and 1.38 kW, respectively, the reverse power threshold value is set to the smallest value among the three of 1.38 kW.

The operation planning device 910 then gives the above determined control parameters priority over the setting information according to the remote control 1101, and uses the control parameters to control the heat pump hot water supply and heating device 900.

As a result, an operation can be achieved in which as little reverse power as possible is output to the energy supplier 908, even when the water inside the hot water supply tank 903*a* is heated by the heat pump hot water supply and heating device 900.

Figure 13:
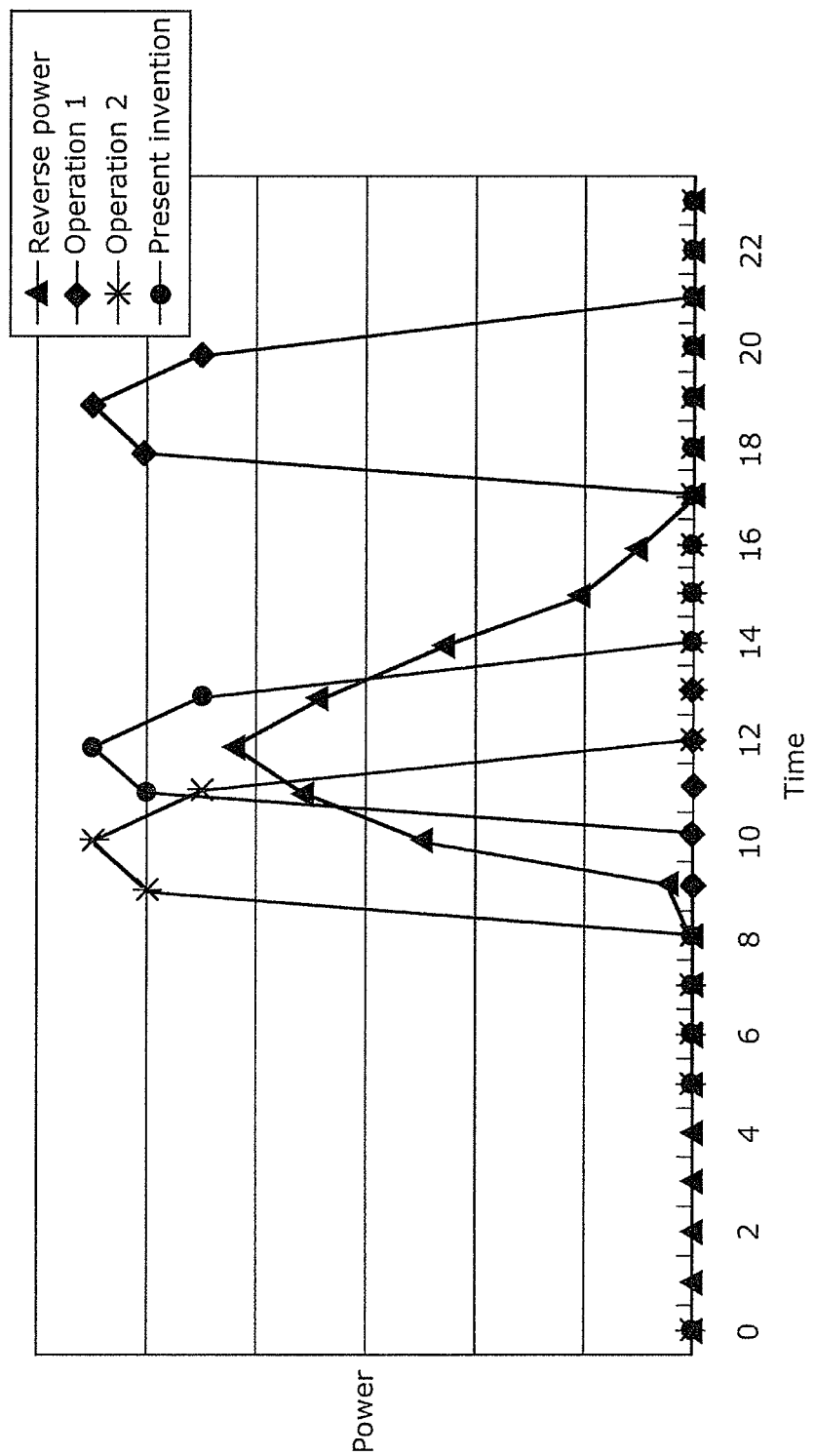
FIG. 13 is an exemplary graph showing power consumption values under different control methods.

FIG. 13 is a comparison of the power consumption required to heat the water inside the hot water supply tank 903*a* when the load prediction unit 302 is not used for the sake of example.

Operation 1 in FIG. 13 is the result of an operation in accordance with the information set by the remote control 1101 in which the water inside the hot water supply tank 903*a*, which is 5° C. below the hot water supply temperature setting, is heated until the water reaches or exceeds the hot water supply temperature setting, whereby the operation is stopped. Here, reverse power cannot be used at all due to the operation being solely dependent on the consumer's amount of hot water supply heat.

Operation 2 in FIG. 13 is the result of an operation in which the operation planning device 910 is not provided with the load prediction unit and in which the hot water supply tank 903*a* is heated when the reverse power threshold value is larger than zero, in other words, when it is detected that reverse power is being generated. Here, when the hot water supply tank 903*a* is heated even when the amount of reverse power is small, an operation time period emerges in which power consumption greatly outweighs reverse power. As a result, reverse power cannot be consumed efficiently. Moreover, when the reverse power threshold value is set to a large value, a possibility exists in which the hot water supply tank 903*a* cannot be heated, such as on a day in which the amount of reverse power is small, for instance.

With the results of the present invention in FIG. 13, it is clear that by operating according to the operation plan using the prediction results of the load prediction unit, the problems inherent in operation 1 and operation 2 are resolved, and the amount of reverse power is minimized.

Following the configuration according to the present invention as outlined above allows for a low-energy performance characteristic to be maintained whereby the amount of reverse power generated is reduced in the heat pump hot water supply and heating system 9000 including the photovoltaic device 911.

(Other Configurations)

Hereinbefore, the heat pump hot water supply system provided with the power generation device and the heat pump hot water supply and heating system according the embodiments of the present invention were described. However, the following embodiments are also acceptable.

While the photovoltaic device is used as an example of the power generation device, a plurality of photovoltaic devices coupled together may also be used as the power generation device.

Moreover, the operation planning device is set up outside the hot water supply and heating device, but the operation planning device may be set up inside the hot water supply and heating device or inside the power distribution device. The operation plan function of the operation planning device may also be a part of the hot water supply device or the power distribution device instead.

Moreover, the reverse power threshold value is calculated by the operation planning unit and the hot water supply and heating device is controlled according to the amount of reverse power using the operation control unit, but the hot water supply and heating device may be operated by setting a timer for a predetermined time period calculated to minimize reverse power, such as from 11:00 through 13:00.

Moreover, the operation planning device performs the operation planning process once a day at 00:00, but the process may be performed more than one time a day and at an arbitrary time such as 02:00 or 06:00 instead of 00:00. In this case, the end of the reverse flow standby time period (24:00 in the embodiments) is also adjusted accordingly. In other words, after the completion of the reverse flow standby time period, which is a time period delimited by the reverse flow standby start time (17:00 in the embodiments) and a predetermined assumed time at which the radiator unit (the hot water supply device) will stop radiating heat, the operation planning device may design an operation plan for the next day.

Moreover, the unit time for the load information and prediction information used in the processing by the operation planning device is one hour, but an arbitrary unit time, such as 15 minutes or one minute, may be used for the information.

Moreover, an average of past values from the same time and day of week is used for the prediction values used by the load prediction unit, but prediction using a neural network or another technique may also be used.

(Other Variations)

It should be noted that although the present invention was described based on the previous embodiments, the present invention is not limited to these embodiments. The following examples are also intended to be included within the scope of the present invention.

Each of the preceding devices is, specifically, a computer system configured from a microprocessor, ROM, RAM, a hard disk unit, a display unit, a keyboard, and a mouse, for example. A computer program is stored in the RAM or the hard disk unit. Each of the devices achieves its function as a result of the microprocessor operating according to the computer program Here, the computer program is configured of a plurality of pieced together instruction codes indicating a command to the computer in order to achieve a given function.

A portion or all of the components of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

A portion or all of the components of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

The present invention may be a method shown above. Moreover, the present invention may also be a computer program realizing these methods with a computer, or a digital signal of the computer program.

Moreover, the present invention may also be realized as the computer program or the digital signal stored on storage media readable by a computer, such as a flexible disk, hard disk, CD-ROM, MO, DVD, DVD-ROM, DVD-RAM, DVD-RAM, BD (Blu-ray Disc), or a semiconductor memory. The present invention may also be the digital signal stored on the above mentioned storage media.

Moreover, the present invention may also be realized by transmitting the computer program or the digital signal, for example, via an electric communication line, a wireless or wired line, a network such as the Internet, or data broadcasting.

Moreover, the present invention may be a computer system including memory storing the computer program and a microprocessor operating according to the computer program.

Moreover, the computer program or the digital signal may be implemented by an independent computer system by being stored on the storage media and transmitted, or sent via the network.

The preceding embodiments and the preceding transformation examples may be individually combined.

Hereinbefore, the embodiments of the present invention were described with reference to the drawings, but the present invention is not limited to the embodiments depicted in the drawings. It is acceptable to add variations to or modify the embodiments depicted in the drawings within the scope of the invention or an equal scope.

INDUSTRIAL APPLICABILITY

The operation planning device according to the present invention is useful in contributing to the stabilization of the power grid when a hot water supply system or a hot water supply and heating system, for example, is in operation.

REFERENCE SIGNS LIST 200 heat pump hot water supply device
201, 901 heat pump
202, 901t, 903a hot water supply tank
203, 903 hot water supply device
205, 905 power distribution device
206, 906 electric load
207, 209 power meter
208, 908 energy supplier
209, 909 server
210, 910 operation planning device
211, 911 photovoltaic device
301 storage unit
302 load prediction unit
303 operation planning unit
304 operation control unit
900 heat pump hot water supply and heating device
901a heat pump unit
902 heat exchanger
903h hot water supply heater
904 heating device
904a heating circuit
1001 hot water supply and heating control device
1010 three-way valve
1101 remote control
2000 heat pump hot water supply system
9000 heat pump hot water supply and heating system

The invention claimed is:

1. An operation planning method performed in a system including a power generation device which is a photovoltaic device, a first electric load which operates using power generated by the power generation device, and a second electric load which generates heat using power generated by the power generation device, said operation planning method designing an operation plan for the second electric load, and comprising:

predicting, for individual unit time periods, an amount of power to be generated by the power generation device and an amount of power to be consumed by the first electric load; and designing the operation plan for the second electric load to cause the second electric load to operate and generate heat by consuming reverse power during an operation period which includes, among the time periods, a time period in which an amount of the reverse power is the largest, the reverse power being calculated by subtracting the amount of power to be consumed from the amount of power to be generated, wherein the second electric load includes a heat generator which generates heat using power generated by the power generation device, heat storage which stores heat generated by the heat generator, and a radiator which radiates heat stored in the heat storage, wherein the predicting includes predicting an amount of heat to be radiated in reverse flow standby by the radiator during a reverse flow standby time period, the reverse flow standby time period being a time period in which the amount of power to be consumed exceeds the amount of power to be generated, and wherein said designing includes designing the operation plan for the operation period, the operation period being determined by selecting one or more of the time periods in descending order of the amount of reverse power until a total amount of time of the one or more selected time periods exceeds an amount of time required for the heat generator to generate the amount of heat corresponding to the amount of heat to be radiated in reverse flow standby as predicted in said predicting, the operation plan being designed such that the amount of heat corresponding to the amount of heat to be radiated in reverse flow standby is stored in the heat storage.

2. The operation planning method according to claim 1, wherein in said designing, a reverse power threshold value is set to be the amount of reverse power with the lowest value among the one or more selected time periods, and the operation plan is designed such that operation of the heat generator is started at a point in time at which the reverse power as actually measured becomes equal to or exceeds the reverse power threshold value during the operation period.

3. The operation planning method according to claim 2, wherein in said designing, the operation plan is further designed such that operation of the heat generator is stopped at a point in time at which the amount of heat corresponding to the amount of heat to be radiated in reverse flow standby is generated during the operation period.

4. The operation planning method according to claim 1, wherein the heat storage includes a thermal storage medium whose temperature varies according to the amount of heat stored, the heat generator includes a heat pump heating the thermal storage medium to a first temperature, and a heater heating the thermal storage medium beyond the first temperature, and in said designing, with respect to the amount of heat corresponding to the amount of heat to be radiated in reverse flow standby, the operation plan is designed to cause the heat pump to generate an amount of heat until the thermal storage medium reaches the first temperature, and cause the heater to generate an amount of heat after the thermal storage medium reaches the first temperature.

5. The operation planning method according to claim 1, wherein in said predicting, the amount of heat to be radiated by the radiator during the reverse flow standby time period is predicted as the amount of heat to be radiated in reverse flow standby, the reverse flow standby time period being a time period delimited by a reverse flow standby start time and a predetermined assumed time at which the radiator will stop radiating heat, and the reverse flow standby start time being a time when the amount of reverse power changes from a positive value to a non-positive value.

6. The operation planning method according to claim 1, wherein in said predicting, the amount of power to be consumed is predicted for each time period to be equivalent to an average of power consumption values previously measured in a corresponding time period on the same day of the week, and the amount of heat to be radiated in reverse flow standby is predicted for each time period to be equivalent to an average of reverse flow standby radiated heat values previously measured in a corresponding time period on the same day of the week.

7. The operation planning method according to claim 1, wherein in said predicting, a predicted amount of solar radiation is obtained for each time period for a prediction target day, and the amount of power to be generated during each time period is predicted to be equivalent to, from among previously measured amounts of generated power, an amount of generated power from the time period having an amount of solar radiation that is closest to the predicted amount of solar radiation.

8. An operation planning device in a system including a power generation device which is a photovoltaic device, a first electric load which operates using power generated by the power generation device, and a second electric load which generates heat using power generated by the power generation device, said operation planning device designing an operation plan for the second electric load, and comprising:

a predictor which predicts, for individual unit time periods, an amount of power to be generated by the power generation device and an amount of power to be consumed by the first electric load; and an operation planner which designs an operation plan for the second electric load to cause the second electric load to operate and generate heat by consuming reverse power during an operation period which includes, among the time periods, a time period in which an amount of the reverse power is the largest, the reverse power being calculated by subtracting the amount of power to be consumed from the amount of power to be generated, wherein the second electric load includes a heat generator which generates heat using power generated by the power generation device, heat storage which stores heat generated by the heat generator, and a radiator which radiates heat stored in the heat storage, wherein the predictor further predicts an amount of heat to be radiated in reverse flow standby by the radiator during a reverse flow standby time period, the reverse flow standby time period being a time period in which the amount of power to be consumed exceeds the amount of power to be generated, and wherein the operation planner designs the operation plan for the operation period, the operation period being determined by selecting one or more of the time periods in descending order of the amount of reverse power until a total amount of time of the one or more selected time periods exceeds an amount of time required for the heat generator to generate the amount of heat corresponding to the amount of heat to be radiated in reverse flow standby as predicted by said predictor, the operation plan being designed such that the amount of heat corresponding to the amount of heat to be radiated in reverse flow standby is stored in the heat storage.

9. An operation method performed by a heat pump hot water supply system including a photovoltaic device, a heat pump hot water supply device, and an operation planning device, said operation method comprising controlling the system by the operation planning device, said controlling including:

predicting an amount of power to be generated by the photovoltaic device and an amount of power to be consumed by an electric load;

calculating an amount of reverse power by subtracting the amount of power to be consumed from the amount of power to be generated;

predicting an amount of heat required in a reverse flow standby time period during which the amount of reverse power is zero;

designing an operation plan which causes the heat pump hot water supply device to operate to store the predicted amount of heat and generate the heat by consuming the reverse power during an operation period which includes a time period in which the amount of reverse power is the largest, and further determining a heat storage target temperature to store the predicted amount of heat and setting a reverse power threshold value to the amount of reverse power with the lowest value among the one or more selected time periods; and controlling, based on the heat storage target temperature and the reverse power threshold value determined and set in said designing, starting operation of the heat pump hot water supply device at a point in time at which the reverse power as measured reaches or exceeds the reverse power threshold value during the operation period, and stopping operation of the heat pump hot water supply device at a point in time at which the predicted amount of heat is generated during the operation period.

10. The operation method performed by the heat pump hot water supply system according to claim 9, wherein the amount of power to be generated, the amount of power to be consumed, and the amount of heat are predicted using history information stored in a storage.

11. The operation method performed by the heat pump hot water supply system according to claim 10, wherein the operation planning device is installed inside the heat pump hot water supply device.

12. An operation method performed by a heat pump hot water supply and heating system including a photovoltaic device and a heat pump hot water supply and heating device, the heat pump hot water supply and heating device including a hot water supply tank and heating device, the system including an operation planning device, said operation method comprising controlling the system by the operation planning device, said controlling including:

predicting an amount of power to be generated by the photovoltaic device and an amount of power to be consumed by an electric load;

calculating an amount of reverse power by subtracting the amount of power to be consumed from the amount of power to be generated;

predicting an amount of heat required in a reverse flow standby time period during which the amount of reverse power is zero;

designing an operation plan which causes the heat pump hot water supply and heating device to operate to store the predicted amount of heat and generate the heat by consuming the reverse power during an operation period which includes a time period in which the amount of reverse power is the largest, and further determining a heat storage target temperature to store the predicted amount of heat and setting a reverse power threshold value to the amount of reverse power with the lowest value among the one or more selected time periods; and controlling, based on the heat storage target temperature and the reverse power threshold value determined and set in said designing, starting operation of the heat pump hot water supply and heating device at a point in time at which the reverse power as measured reaches or exceeds the reverse power threshold value during the operation period, and stopping operation of the heat pump hot water supply and heating device at a point in time at which the predicted amount of heat is generated during the operation period.

13. The operation method performed by the heat pump hot water supply and heating system according to claim 12,
 wherein in said designing, the heat storage target temperature for storing the predicted amount of heat in a hot water supply tank is determined, and
 a thermal storage medium inside the hot water supply tank is heated to a first temperature with a heat pump included in the heat pump hot water supply and heating device, then the thermal storage medium is heated to a second temperature which is higher than the first temperature with a heater installed in the hot water supply tank.

14. The operation method performed by the heat pump hot water supply and heating system according to claim 12,
 wherein the heat pump hot water supply and heating device includes a hot water supply and heating control device, and
 the hot water supply and heating control device is set up to receive operation information for the heat pump hot water supply and heating device from a remote control and from the operation planning device, and
 when the operation information is received by the operation planning device, gives the operation information from the operation planning device priority over the operation information from the remote control, and controls the heat pump hot water supply and heating device based on the operation information from the operation planning device.

15. The operation method performed by the heat pump hot water supply and heating system according to claim 14,
 wherein the operation information is an operation mode for the heat pump hot water supply and heating device, and a hot water supply temperature setting for the hot water supply tank.

16. The operation method performed by the heat pump hot water supply and heating system according to claim 12,
 wherein the heat pump hot water supply and heating device includes a heat exchanger, and
 a thermal storage medium supplied from the heat exchanger is controlled via a switching device so as to be supplied to one of a hot water supply tank and a heating device.

\* \* \* \* \*